US012490860B2

(12) United States Patent
Currid et al.

(10) Patent No.: US 12,490,860 B2
(45) Date of Patent: Dec. 9, 2025

(54) ADAPTABLE TRAILER-HITCH MOUNTED GRILL SYSTEM

(71) Applicant: Hitch Fire Inc., Soquel, CA (US)

(72) Inventors: Evan Michael Currid, Santa Cruz, CA (US); Jared Ryan Naito, Santa Barbara, CA (US); Marco Antonio Jose Vanella, Santa Barbara, CA (US); Peter Anthony Ducato, Santa Barbara, CA (US)

(73) Assignee: HITCH FIRE INC., Soquel, CA (US)

( * ) Notice: Subject to any disclaimer, the term of this patent is extended or adjusted under 35 U.S.C. 154(b) by 567 days.

(21) Appl. No.: 17/655,766

(22) Filed: Mar. 21, 2022

(65) Prior Publication Data

US 2022/0296042 A1   Sep. 22, 2022

Related U.S. Application Data

(60) Provisional application No. 63/163,255, filed on Mar. 19, 2021.

(51) Int. Cl.
*A47J 37/07* (2006.01)
*B60R 9/06* (2006.01)

(52) U.S. Cl.
CPC ............. *A47J 37/0786* (2013.01); *B60R 9/06* (2013.01); *A47J 2037/0777* (2013.01)

(58) Field of Classification Search
CPC ............ A47J 37/0786; A47J 2037/0777; A47J 37/0763; B60R 9/06; B60R 2011/004; B60R 11/00
USPC ........................................................ 126/25 R
See application file for complete search history.

(56) References Cited

U.S. PATENT DOCUMENTS

| 1,386,664 | A | * | 8/1921 | Vaeth ................... F16M 11/242 |
| | | | | 248/187.1 |
| 3,526,217 | A | * | 9/1970 | Garske ................ A47J 37/0763 |
| | | | | 126/30 |
| 5,094,373 | A | | 3/1992 | Lovci |
| 5,626,126 | A | | 5/1997 | McNulty |
| 5,640,949 | A | | 6/1997 | Smith |
| 6,082,269 | A | | 7/2000 | Padberg |

(Continued)

OTHER PUBLICATIONS

Weber Q 1200 1-Burner Portable Tabletop Propane Gas Grill in Titanium with Built-In Thermometer-51060001—The Home Depot, https://www.homedepot.com/p/Weber-Q-1200-1-Burner-Portable-Tabletop-Propane-Gas-Grill-in-Titanium-with-Built-In-Thermometer-51060001/204613487, retrieved Jan. 15, 2020.

(Continued)

*Primary Examiner* — Allen R. B. Schult
*Assistant Examiner* — William C Weinert
(74) *Attorney, Agent, or Firm* — VLP Law Group, LLP; Michel Bohn

(57) ABSTRACT

A hitch-mountable grill and swing arm system is described. In an example implementation, the system may include a grill body including a hood and a base, a swing arm system, and an accessory mounting point connected with the swing arm system that may mount an accessory to the swing arm system separate to the grill body. In some implementations, the swing arm system may include a hitch arm adapted to couple to a hitch receiver of a vehicle, a swing arm coupled to the hitch arm by a pivot mechanism, a pivot lock adapted to stop rotation of the pivot mechanism, and a grill-mounting member detachably coupling the swing arm to the grill body.

16 Claims, 21 Drawing Sheets

(56) References Cited

U.S. PATENT DOCUMENTS

| | | | |
|---|---|---|---|
| 6,189,458 B1 | 2/2001 | Rivera | |
| 6,354,286 B1 | 3/2002 | Davis | |
| 6,520,473 B2 | 2/2003 | Lee | |
| 6,575,155 B2 | 6/2003 | Brennan | |
| 6,701,913 B1 * | 3/2004 | LeDuc | B60R 9/06 |
| | | | 126/30 |
| 6,722,380 B1 | 4/2004 | Hafer | |
| 6,725,855 B1 | 4/2004 | Brennan | |
| 6,814,383 B2 | 11/2004 | Reed, III et al. | |
| 7,261,229 B1 | 8/2007 | Allen et al. | |
| D566,462 S | 4/2008 | LeDuc et al. | |
| D566,631 S | 4/2008 | Shahan | |
| 7,591,404 B2 | 9/2009 | LeDuc et al. | |
| 7,631,791 B1 | 12/2009 | Allen et al. | |
| 8,065,996 B1 | 11/2011 | Neuvelt | |
| 8,231,036 B2 | 7/2012 | Campbell et al. | |
| 8,672,200 B2 | 3/2014 | Ohare | |
| 8,696,075 B1 * | 4/2014 | Rios | A47F 10/06 |
| | | | 312/249.12 |
| 9,215,950 B2 | 12/2015 | Walker | |
| 9,499,104 B2 * | 11/2016 | Hux | B60R 9/06 |
| 10,206,495 B2 | 2/2019 | Smith | |
| 2004/0040553 A1 | 3/2004 | McKoski | |
| 2006/0016447 A1 | 1/2006 | Meyer | |
| 2008/0061097 A1 | 3/2008 | Milender et al. | |
| 2008/0098902 A1 | 5/2008 | Mansfield et al. | |
| 2008/0314946 A1 | 12/2008 | Owenby | |
| 2009/0140024 A1 * | 6/2009 | McLemore | B60R 9/06 |
| | | | 224/495 |
| 2012/0292357 A1 | 11/2012 | Tennyson et al. | |
| 2013/0213381 A1 | 8/2013 | Schul et al. | |
| 2015/0265099 A1 * | 9/2015 | Coffie | A47J 37/0745 |
| | | | 99/339 |
| 2015/0274091 A1 * | 10/2015 | Lang | G01D 11/30 |
| | | | 348/148 |
| 2016/0348922 A1 | 12/2016 | Knight | |
| 2019/0053667 A1 | 2/2019 | Jensen | |
| 2022/0142407 A1 * | 5/2022 | Myra | A47J 47/005 |

OTHER PUBLICATIONS

Freedom Grill Heats Up Tailgating with Launch of New FG-50 "Ride Outside" Grill, Business Wire, retrieved Aug. 13, 2019.

Freedom Tailgate FG50 BBQ Grill with Swing Arm, eBay, https://www.ebay.com/itm/FREEDOM-TAILGATE-FG50-BBQ-GRILL-with-Swing-Arm-New/183738925645?hash=item2ac7b1824d:g:KT8AAOSwntRcXy~v, retrieved Aug. 13, 2019.

Margaritaville Tailgating Grill Eulogy, Tailgating Ideas, www.tailgatingideas.com/margaritaville-tailgating-grill-eulogy/, retrieved Aug. 13, 2019.

Tailgate N Go, Organize Your Outdoor Adventure, TailgateNGo, https://tailgatengo.com, retrieved Feb. 25, 2021.

Twin Redzone Grill Hauler Hitch, Party King Grills, https://partykinggrills.com/shop/twin-redzone-grill-hauler-hitch/, retrieved Aug. 13, 2019.

* cited by examiner

# ADAPTABLE TRAILER-HITCH MOUNTED GRILL SYSTEM

BACKGROUND

The present disclosure relates to barbeque grills. Implementations relate to automotive trailer hitch-mounted accessories.

Many outdoors enthusiasts enjoy transporting various accessories, such as barbeque grills, with them on their vehicle, so that they can cook while camping or tailgating. Typical portable grills take up significant amounts of space inside a vehicle or are too small or compromised to provide a good cooking experience. Previous grills, however, may not be properly adapted to mount to trailer hitches, may not support interchangeability and adaptability, or are not strong enough to handle prolonged stresses of being mounted to a trailer hitch.

Previous hitch-mounted cooking devices were generally standard cooking devices merely attached to a vehicle's trailer hitch, so they were not well adapted to be transported in the rough environment external to a vehicle. Additionally, because they were transported on the outside of a vehicle, they lacked preparation areas and accessories, especially coupled with the cooking device using traditional methods. Accordingly, there is a need among such trailer-hitch accessories to improve style, adaptability, ease of use, and utility.

SUMMARY

A hitch-mountable grill and swing-arm system can be configured to perform particular operations or actions by virtue of having software, firmware, hardware, or a combination of them installed on the system that in operation causes or cause the system to perform the actions. One general aspect of the system includes a grill body including a hood and a base; a swing arm system including a hitch arm adapted to couple to a hitch receiver of a vehicle, a swing arm coupled to the hitch arm by a pivot mechanism, a pivot lock adapted to stop rotation of the pivot mechanism, and a tower detachably coupling the swing arm to the grill body, the tower including a vertical portion of the swing arm; and one or more accessory mounting points connected with the swing arm system, the one or more accessory mounting points mounting an accessory separate to the grill body.

Implementations of the system may include one or more of the following features. The system further including: an accessory mounting bracket coupled with the one or more accessory mounting points, the accessory mounting bracket coupled with an elongated pole, the elongated pole extending vertically from the swing arm system when the swing arm system is mounted to the vehicle; a cutting board including a flat top surface and a reinforced bottom surface opposing the top surface, the bottom surface including one or more accessory bracket mounting points that couple with the accessory mounting bracket to secure the cutting board with the swing arm system; and that the one or more accessory mounting points include a structure connected with the hitch arm, the structure receiving and securely retaining a fastener of the accessory mounting bracket.

Implementations of the system may include one or more of the following features. The system further including: an arm collar couplable to one or more of the swing arms, a chassis coupled to the grill body, and the grill body, wherein the arm collar includes a mounting plate including a flat top surface that is adapted to couple to one or more of the chassis and the grill body, a friction collar coupled with the mounting plate and adapted to provide rotational friction between the friction collar and the tower of the swing arm, and a channel extending circumferentially around the arm collar, the channel adapted to couple with the swing arm while the arm collar rotates around an axis formed by the tower of the swing arm; that the tower of the swing arm includes a tab coupled to the tower, the tab including an aperture that aligns with a portion of the channel when the arm collar is coupled to the tower, the aperture allowing a locking member to pass through the aperture and the channel to lock the arm collar to the tower.

Implementations of the system may include one or more of the following features. The system further including: a chassis including a frame attached to and supporting the grill body, the chassis including one or more handles integrated with the frame and located at one or more sides of the grill body; one or more preparation tables coupled to the chassis and adapted to pivot between an open position and a closed position, the one or more preparation tables resting on the one or more handles when in the open position, the one or more preparation tables contacting the hood when in the closed position, the hood exerting a force on the one or more preparation tables when the hood and the one or more preparation tables are closed; and that the one or more preparation tables include a burner that pivots with the one or more preparation tables.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
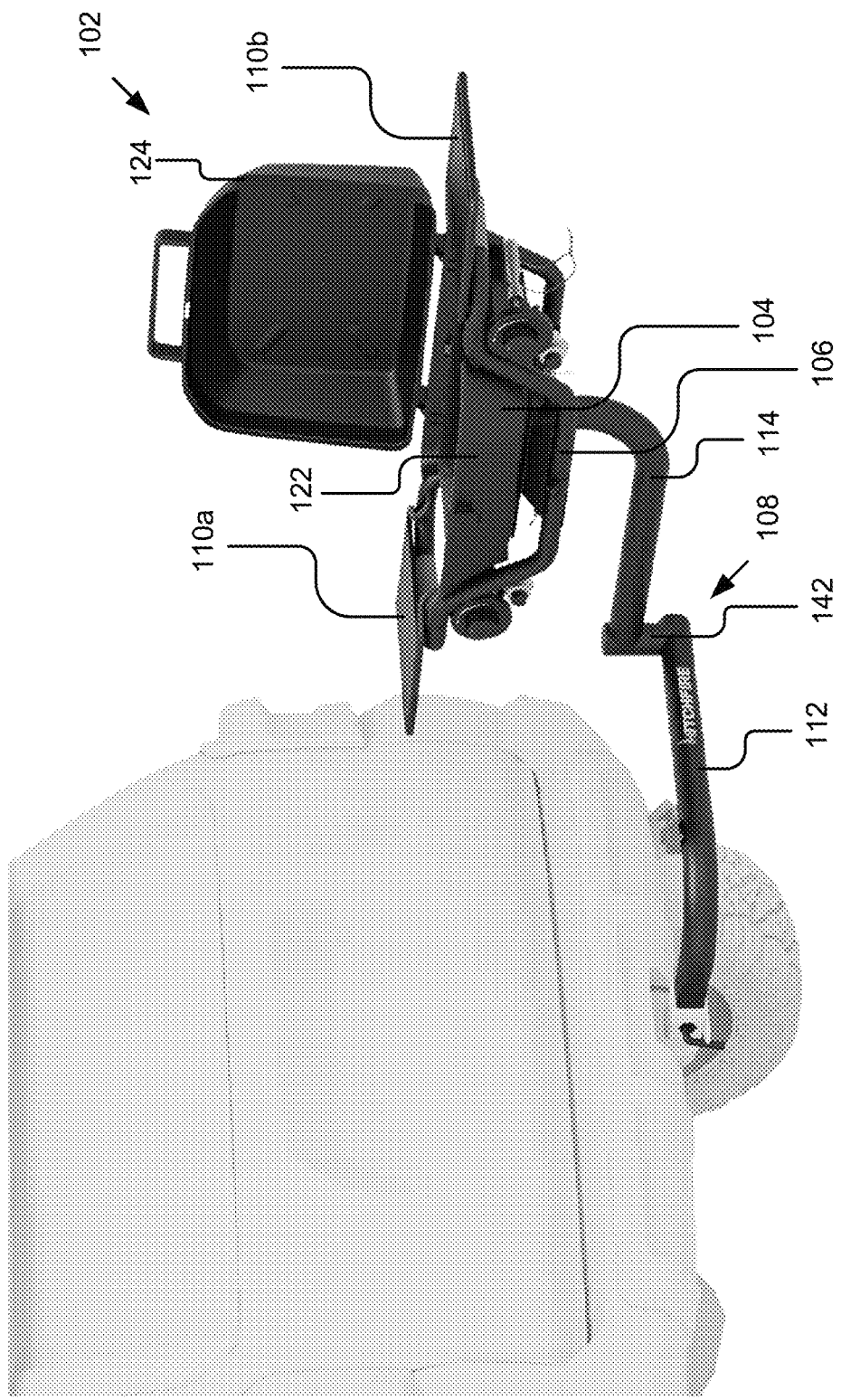
FIG. 1A illustrates an example grill system mounted to a vehicle and pivoted to an open position.

The present disclosure describes an innovative technology relating to an adaptable trailer-hitch mountable grill system 102 (hereinafter "grill system") that may be coupled to automobiles or other vehicles, for example. The grill system 102 may include a grill body 104, a chassis system 106 holding the grill body 104, a swing-arm system 108 coupling the grill body 104 to a trailer hitch, preparation tables 110a and 110b coupled with the grill body 104 and/or chassis system 106, and/or other components described herein. The grill system 102 may also include various accessories, such as a cutting board coupled with the swing-arm system 108. The grill system 102 may include the swing-arm system 108 or may be separate therefrom.

The grill system 102 described herein provides increased strength and decreases movement and vibration, also referred to herein as slop, in the grill system 102 to improve its performance coupled to the exterior of a vehicle, for example, via a trailer hitch. For instance, significant forces may be exerted on a trailer hitch mounted grill, accessory, or other device, thereby causing the device to rattle, squeak, or even break. The grill system 102 reduces this slop, thereby improving portability, durability, and overall performance. For example, the chassis system 106, swing arm 114 system 108, grill body 104, or preparation/side tables 110, etc., may be under tension/compression to prevent movement, as described below.

The grill system 102 also provides adaptability, for instance, by allowing the grill body 104 to be mounted on the left or the right side of a vehicle; by adjusting to various heights and angles; by allowing additional accessories to be mounted to a swing arm 114, grill body 104, or chassis system 106; by allowing the chassis and/or grill body 104 to be replaced on the swing arm 114 (e.g., a tower or vertical member of the swing arm 114) by additional or alternative accessories (e.g., a table, umbrella, seat, cutting board, etc.); and other features. These and other advantages are described in further detail below.

For example, some implementations of the grill system 102 include an accessory that may be mounted to the swing-arm system 108, which may include a hitch arm 112 and a swing arm 114, among other components described below. For instance, a table or cutting board may be detachably mounted to a hitch arm 112, so that when the swing arm 114 and grill are pivoted away from the hitch arm 112, the cutting board would be adjacent to the grill body 104 and/or preparation table(s) 110.

With reference to the figures, reference numbers may be used to refer to components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components.

Figure 1B:
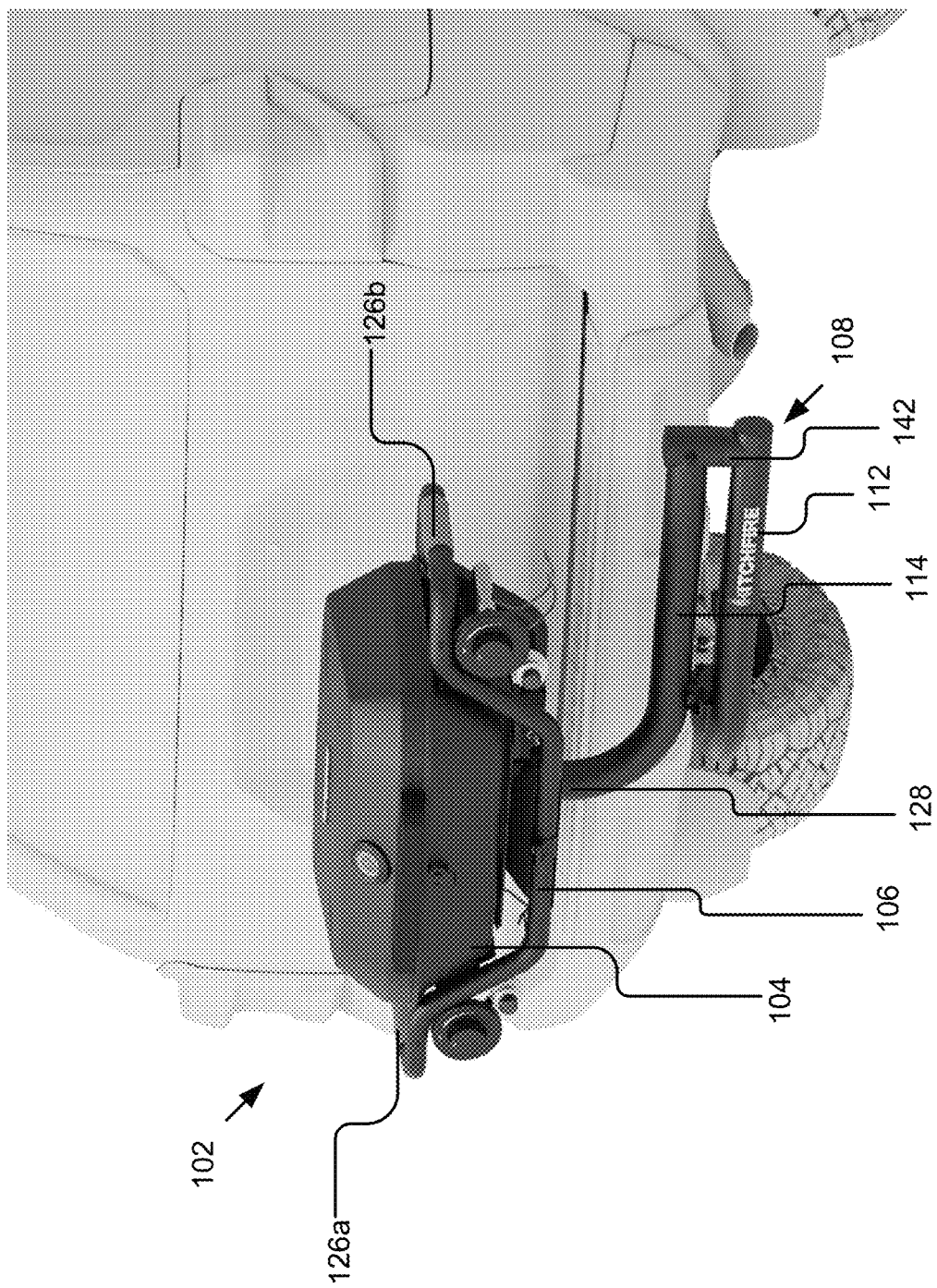
FIGS. 1B and 1C illustrate an example grill system mounted to a vehicle and pivoted to a closed position.
Figure 1C:
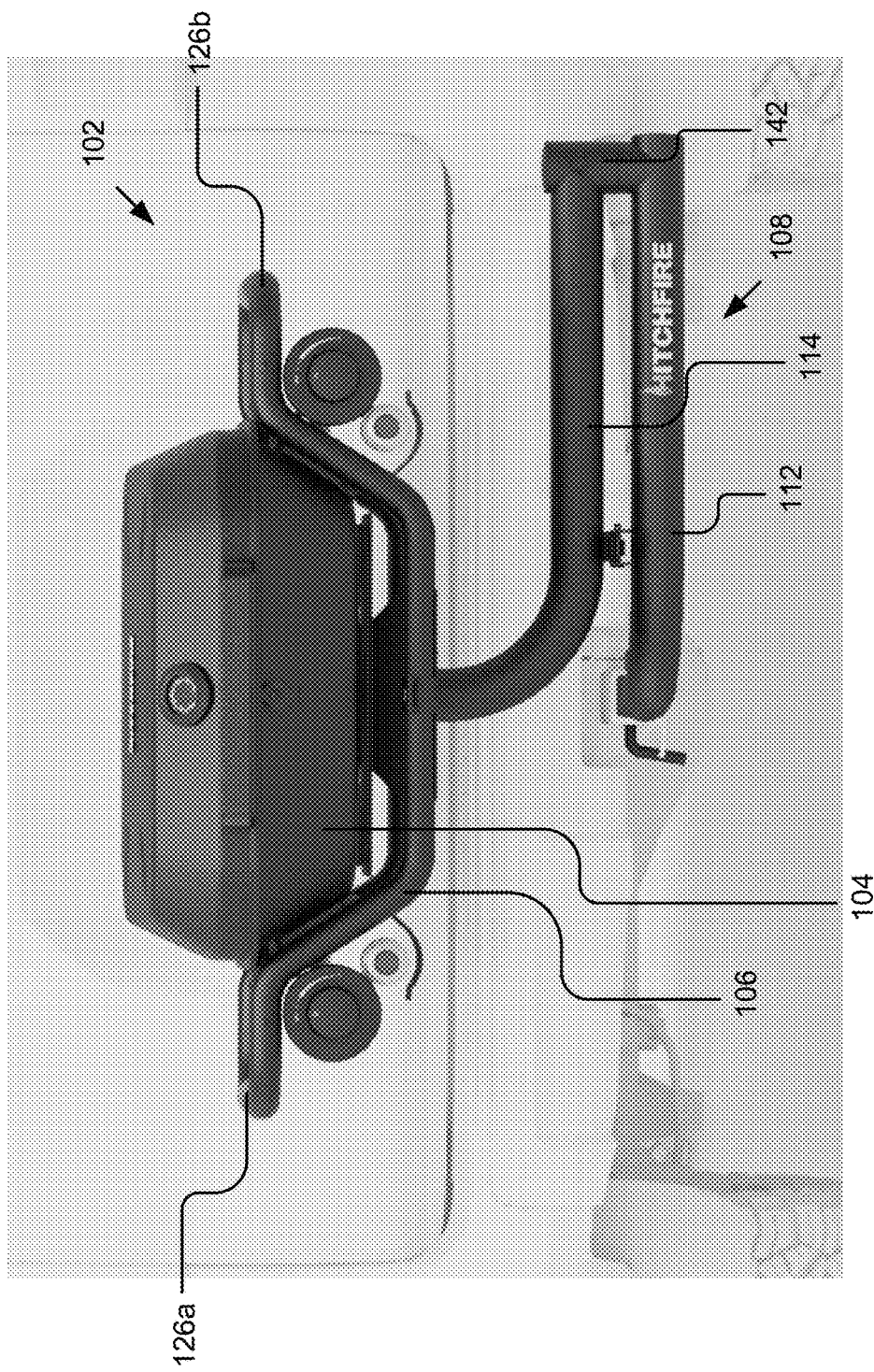

FIG. 1A illustrates an example grill system 102 mounted to a vehicle and pivoted to an open position, for example, where a swing arm 114 is pivoted away from the vehicle and hitch arm 112. FIGS. 1B and 1C illustrate an example grill system 102 mounted to a vehicle and pivoted to a closed position, for example, where the swing arm 114 is pivoted near the vehicle and hitch arm 112. As illustrated, the grill system 102 may be mounted to a trailer-hitch receiver of a vehicle.

In the illustrated example, the grill system 102 may include a grill body 104, a frame or chassis, fold-out preparation tables 110/surfaces, carrying handles 126, a swing-arm system 108, and/or other components, as described herein. For example, a grill body 104 may include a base 122 and a hood 124 enclosing an interior cavity in which a heating element is enclosed. Although a certain configuration of gas barbeque grill is described, it should be noted that other shapes, configurations, or devices are possible in place of the example grill body 104. For instance, the grill body 104 may additionally or alternatively include a storage container, a sink, a burner, a grill grate, or other components. Similarly, although a gas grill is described, it may include propane, natural gas, electric, induction, or other types of heating elements.

As illustrated in the example implementation, a frame or chassis system 106 (also referred to herein simply as "chassis" 106) may be coupled with the grill body 104 thereby providing various benefits, such as strength, handles, legs, mounting points, etc., as described in further detail below. For instance, chassis 106 may include an adapter plate 222 (e.g., described and illustrated in reference to FIG. 5A) coupling the chassis 106 to the base 122 of the grill body 104. The chassis 106 may also include one or more handles 126a and 126b, which may be used to lift the grill body 104 from the swing-arm system 108 and one or more pads, bars, or legs on which the chassis 106 may rest when not on the swing-arm system 108.

As illustrated in the example implementation, the grill system 102 may also include a swing-arm system 108, which includes a hitch arm 112 coupled with/couplable to a hitch receiver of a vehicle and a swing arm 114 coupled to the hitch arm 112 by a pivot mechanism 142. The hitch arm 112 may include a receiver lock that secures an end of the hitch arm 112 with a vehicle hitch receiver. In some implementations, the swing-arm system 108 may also include one or more pivot locks 238 and/or swing-arm releases that stop rotation of the pivot mechanism 142, for example, by locking the pivot mechanism 142 and/or securing the swing arm 114 adjacent to the hitch arm 112.

In some implementations, the swing arm 114 may include a vertical portion 128 (e.g., a separate or integrated tower) that couples with the chassis 106, adapter plate 222, and/or grill base 122, although other implementations are possible and contemplated herein.

In some implementations, as illustrated below, one or more of the hitch arm 112 and the swing arm 114 may include accessory mounting points adapted to mount accessories, such as tables, cutting boards, or other devices to the swing-arm system 108 separate to the grill body 104 or chassis 106.

These and other features are illustrated and described in further detail below. It should be noted that the provided implementations are examples and that other configurations are possible and contemplated herein.

Figure 1D:
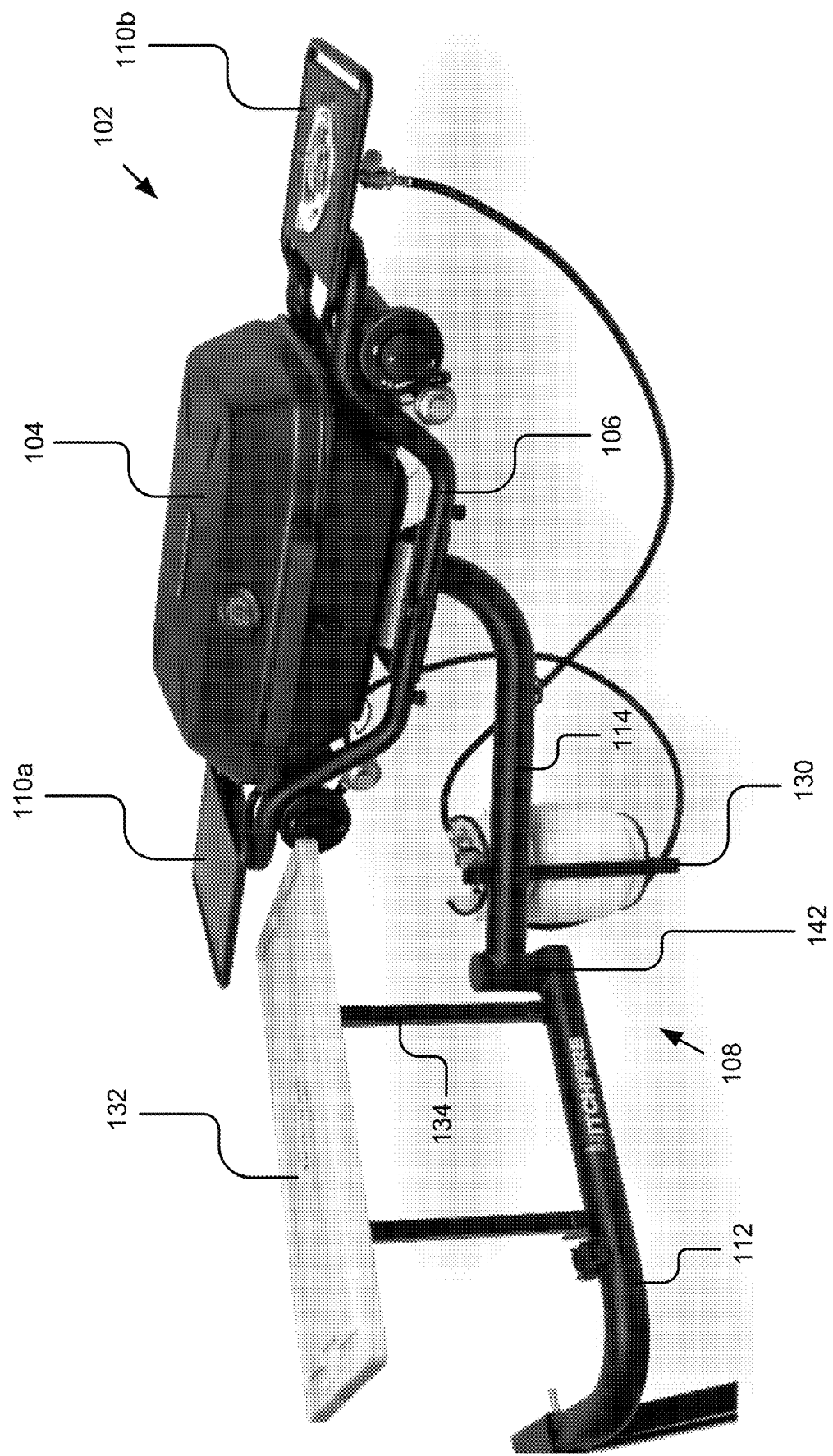
FIG. 1D illustrates an example grill system with example accessories mounted thereto.

FIG. 1D illustrates an example grill system 102 with example accessories mounted thereto. For example, FIG. 1D illustrates an example accessory cutting board mounted to a hitch arm 112, an example burner coupled with an example side preparation table 110, and an example propane tank holder 130.

For example, FIG. 1D illustrates an accessory table 132 that couples with the swing-arm system 108. For instance, the accessory table 132 may be coupled with the swing-arm system 108 via an accessory mounting bracket, which may include one or more elongated poles or table legs 134 that insert into, are integrated with, or couple with accessory mounting bracket(s), which couple the table legs 134 with the swing arm 114 and/or hitch arm 112. In some implementations, the legs or brackets of the accessory table 132 may slide within a sleeve or otherwise couple with the hitch arm 112, for example, at accessory mounting points. The accessory mounting points may include screw holes, protrusions, channels, or other structures for coupling with the leg(s) or accessory mounting bracket(s), as described in further detail below. In some implementations, a leg or accessory mounting bracket may be hinged or adjustable in order to level the accessory table 132, for example, when the vehicle is parked on non-level surface. The accessory table 132, cutting board, and other accessories are described in further detail below, for example, in reference to FIGS. 4A and 4B.

FIG. 1D also illustrates an example propane tank mounting bracket 130. For instance, the tank mounting bracket 130 may couple with the swing arm 114 proximate to the grill. In some instances, the tank mounting bracket 130 may hang to one side (e.g., with a J shape, as shown) of the swing arm 114 so that it does not interfere with the hitch arm 112 when the swing arm 114 is in a storage/closed position over the hitch arm 112.

In some implementations, the hood 124, base 122, chassis 106, preparation tables 110, etc., may include other brackets, coupling points, screw holes, etc., that allow additional accessories to be permanently or temporarily attached to the grill system 102 and/or swing-arm system 108. For example, a cutting board, umbrella, fan, or other accessory may be attached.

In some implementations, the grill system 102 may include one or more bottle openers for opening beverage or food containers. For example, a bottle opener may be attached to or integrated into the chassis 106 (e.g., on the frame), which may provide significant structural rigidity, as described above, thereby allowing bottles to be more easily opened. Similarly, the swing arm 114, chassis 106, or preparation tables may include one or more cup/bottle holders for securely holding beverage containers even when the grill or swing-arm system 108 are not level or are moving (e.g., when the swing arm 114 is being adjusted about the pivot). For instance, one or more cup holders may be attached or integrated into the top or sides of the swing arm 114, so that someone using the grill may store a cup or bottle in a cup holder and pivot the grill without worrying that the bottle will tip or fall, for example, from a preparation table 110.

Although the grill system 102 is illustrated as using propane, in some implementations, the grill system 102 and/or swing-arm system 108 may include electrical components, such as a power strip, whip, or plugs integrated into or attached to the swing arm 114, chassis 106, grill body 104, preparation table 110, etc. For instance, the electrical components may power smartphone chargers, speakers, lights, fans, portable refrigerators, etc., for example, using a hitch power plug-in, a high-voltage power output (e.g., of an electric vehicle), 12 v electrical socket, USB outlet, etc., of a vehicle or generator. For example, the electrical components may include a wiring harness, wires, plugs, inverters, etc., that travel inside, are attached to, and/or exit the swing arm 114 near the vehicle and have an electrical (e.g., USB port, 120-volt outlet, etc.) near the grill on the swing arm 114 (e.g., on the tower). In some implementations, the electrical components may be integrated into the chassis 106, grill body 104, or preparation tables 110. The wiring may pass between the chassis 106 and swing-arm system 108 (e.g., connected via plug inside, integrated with, or adjacent to the tower) to the power source at the vehicle.

In some implementations, a grill heating element may be electric and powered via this connection to the vehicle. For example, electric vehicles with large batteries may provide a power output (e.g., from the bed of an electric pickup truck) that runs the grill and other accessories electrically coupled with the electrical components of the grill system 102 and/or swing-arm system 108.

In some implementations, a component of the swing-arm system 108 and/or grill system 102 may house or couple to a battery to power the electrical components. Similarly, as described below, the heat of the grill may power a battery or one or more electrical accessories.

In some implementations, the grill system 102 may include integrated or attachable lighting. For example, an LED or other light may be integrated with the hood 124, so that when the hood 124 is opened, the light shines on the grill surface and/or preparation tables 110. In some implementations, the light may be powered by the wire harness described above, a battery, or the heat of the grill. For instance, the light may be powered by a BioLite thermopile, Peltier generator, or other thermoelectric generator, which could also be used to power other electronics such as a smart phone, fan, or speaker.

In some implementations, the light could be integrated into the handle 126 which may include a protrusion or extendable portion or be shaped to allow the light to shine onto the grill surface when the hood 124 is open.

Figure 2A:
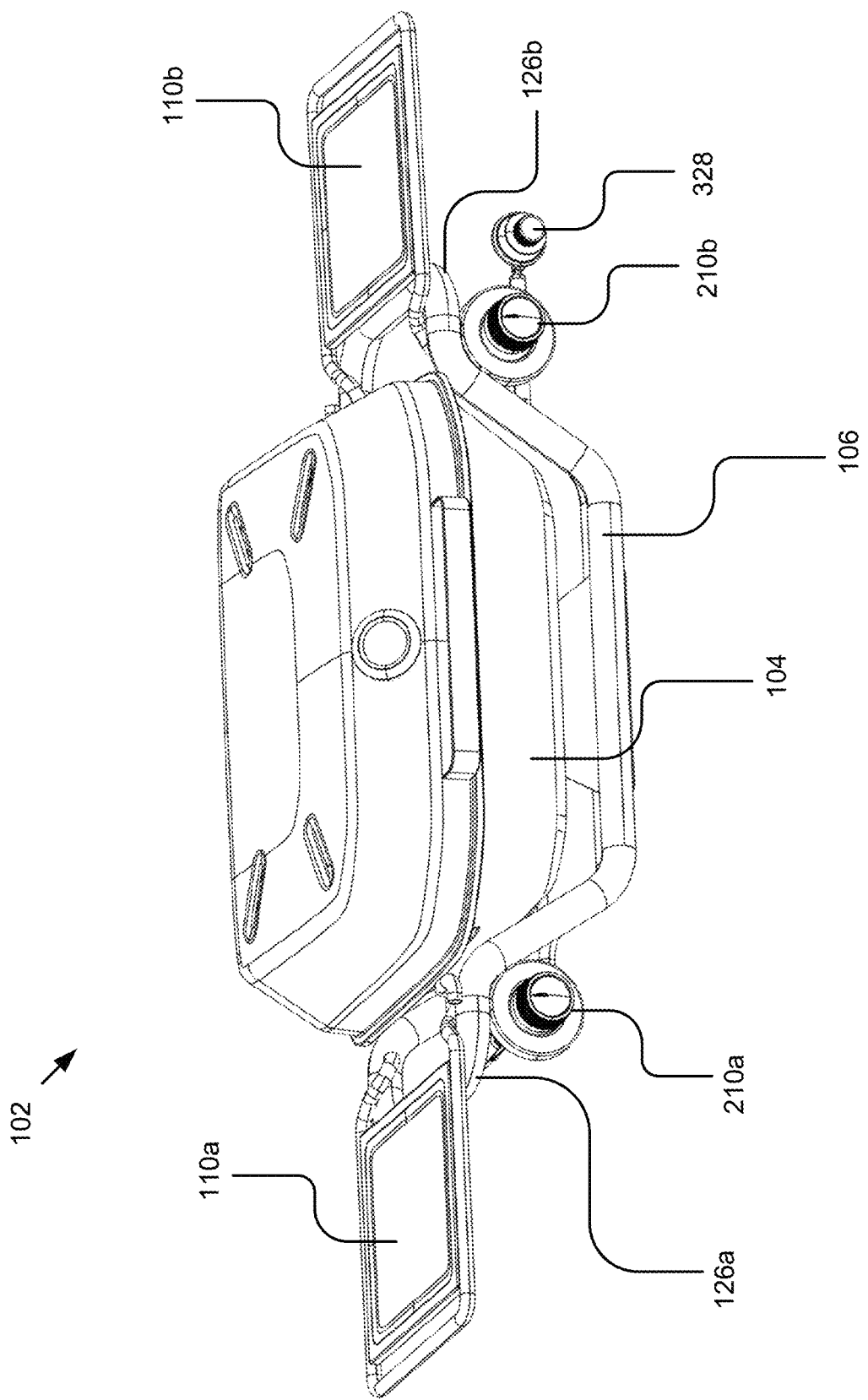
FIG. 2A illustrates an example implementation of a grill system decoupled from a swing arm and vehicle.

FIG. 2A illustrates an example implementation of a grill system 102 decoupled from a swing arm 114 and vehicle. The figure illustrates a grill body 104, preparation tables 110a and 110b, chassis 106/frame, burner knobs 210a and 210b, and other components. For example, as illustrated, the chassis 106 including a frame attached to and supporting the grill body 104, the chassis 106 including one or more handles 126 integrated with the frame and located at one or more sides of the grill body 104. In some implementations, as illustrated in FIG. 2A and as described in further detail below, the preparation tables 110, when opened, may rest on the chassis 106 (e.g., on the carrying handles 126) to provide vertical support and stability to the preparation tables 110.

As illustrated in FIG. 2A, the grill body 104 may be attached to a chassis 106 system 106 that provides support to the grill body 104 and other components and accessories. Example implementations of the chassis system 106 are further illustrated and described in reference to FIGS. 2B and 5A.

Figure 2B:
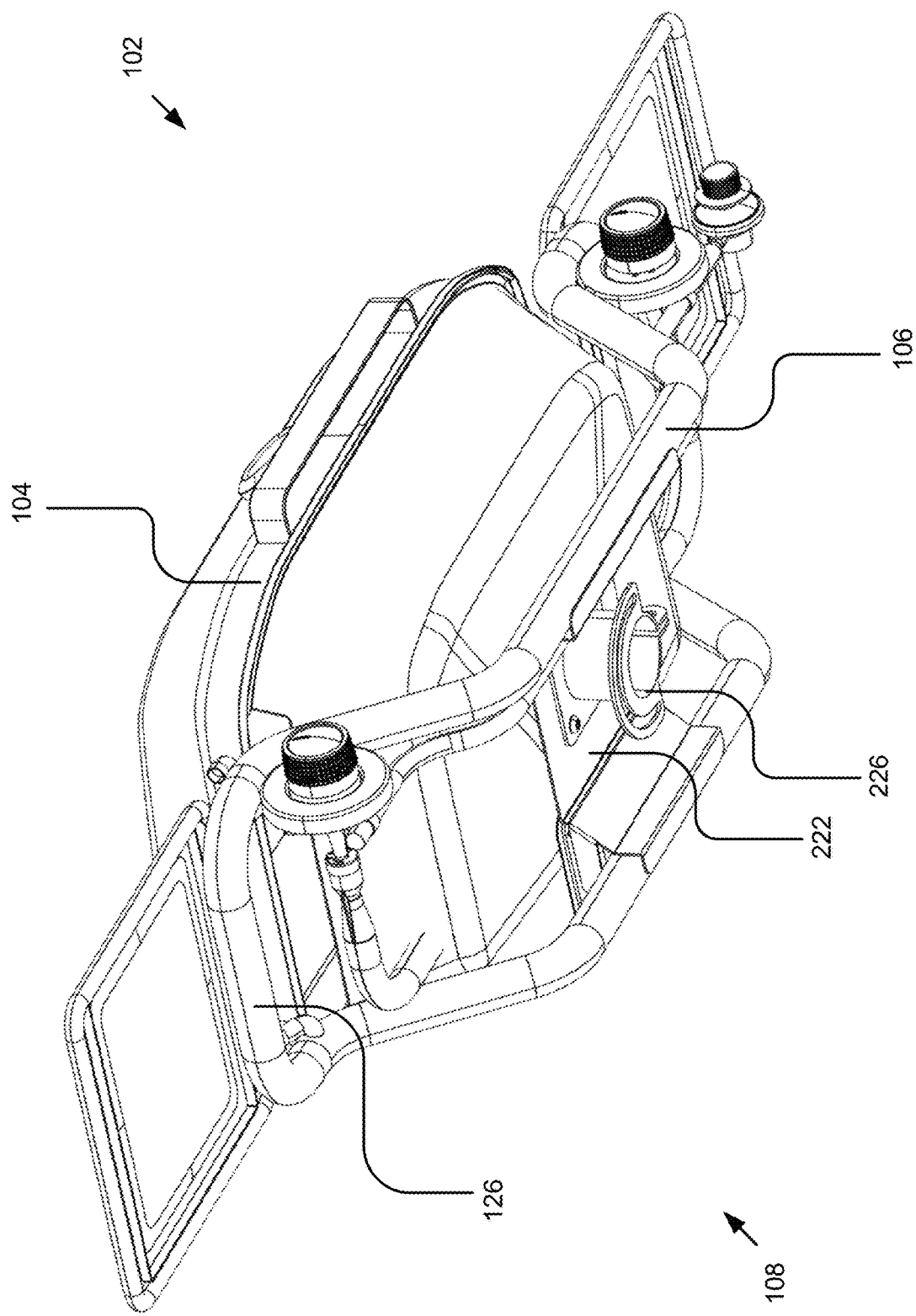
FIG. 2B illustrates an example implementation of a grill system from a bottom-up perspective.

FIG. 2B illustrates an example implementation of a grill system 102 from a bottom-up perspective and detached from a swing-arm system 108 and vehicle. In the illustrated example, a chassis system 106 may include an adapter plate 222 coupling the chassis system 106 to a bottom side of the base 122 of the grill body 104, for example, which may hold the frame away from the body of the grill, thereby providing a gap to prevent heat transfer and mounting of accessories, such as a grill cover. The adapter plate 222 may also provide mounting points for an arm collar 226, as described below, a drip tray, fuel transfer pipes, and/or other components.

As illustrated, depending on the implementation, the carrying handles 126 may be integrated into the chassis 106 thereby allowing the strong chassis 106 to lift the grill body 104, preparation tables 110, and/or the swing-arm system 108 from the vehicle or other surface. In some implementations, the chassis 106 or grill body 104 may be detached from the swing-arm system 108 and the carrying handles 126 may be used to lift the grill body 104 and chassis 106 from the swing-arm system 108. For instance, the chassis 106 may have a flat bottom and/or legs that may support the grill system 102 when removed from the swing-arm system 108 and placed on a surface, such as a table. In some implementations of the chassis 106 may provide a gap between the grill base 122 and a surface upon which the chassis 106 is resting to prevent the surface from being burned/melted by the heat of the grill.

It should be noted that although the chassis system 106 is illustrated as being coupled with a grill body 104, in some implementations, the devices and features described herein may couple with different types of grill bodies, griddles, storage container, sinks, or other devices. For instance, the chassis system 106 may hold a storage container and couple with a swing-arm system 108.

The chassis system 106 may mount to a swing-arm system 108 using a tower or other portion of a swing arm 114, as described above. For instance, a tower (e.g., a vertical portion of the swing arm 114, as noted above) may couple with an arm collar 226, which may be attached to the adapter plate 222, and the adapter plate 222 may be attached to one or more of the frame and the grill base 122. The chassis system 106 may also be used to mount other items, for example, the chassis system 106 may be expanded or re-configured to other sizes or shapes of grills and accessories. Example implementations of an arm collar 226 or other grill-mounting members are described in further detail elsewhere herein, such as in reference to FIGS. 3C and 3D.

In some implementations, the chassis system 106 may include a gas cannister connector or holder 328 that attaches a gas (e.g., propane, etc.) cannister or tank to the chassis system 106. The gas cannister holder 328 may allow the gas cannister to remain coupled with the grill system 102 during transport or to be easily coupled once stationary.

Figure 2C:
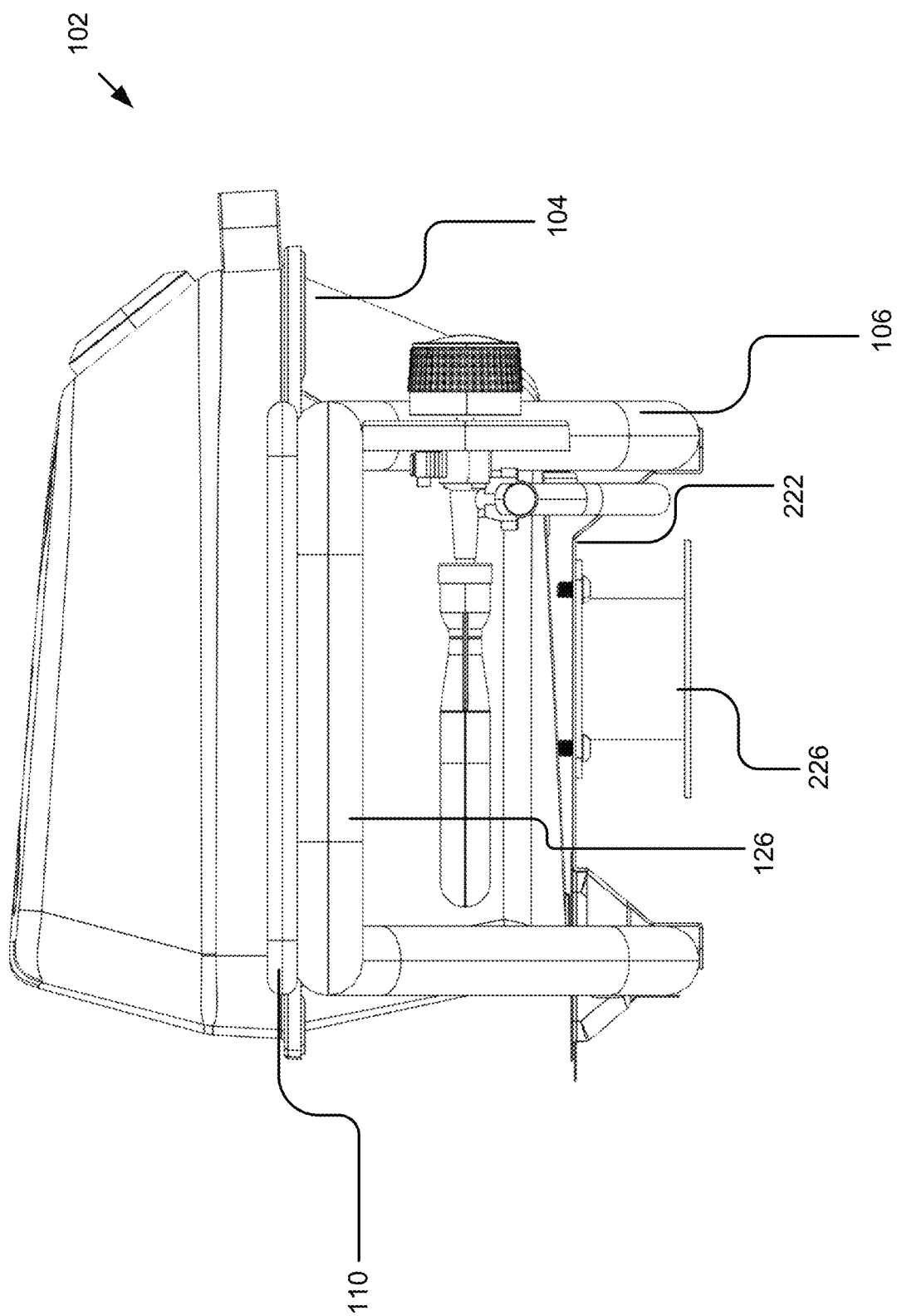
FIG. 2C illustrates an example implementation of a grill system from a side perspective.

FIG. 2C illustrates an example implementation of a grill system 102 from a side perspective. As illustrated, the chassis 106 may extend further downward from the grill body 104 than the arm collar 226, so that the chassis 106 may support the weight of the grill body 104 when removed from a swing-arm system 108 and placed on a flat surface, such as a table. Although not illustrated in FIG. 2C, the chassis 106 may also include one or more legs or feet disposed along the bottom.

As illustrated in FIG. 2C, in some implementations, a side preparation table 110 may rest on the handle 126 when deployed.

Figure 2E:
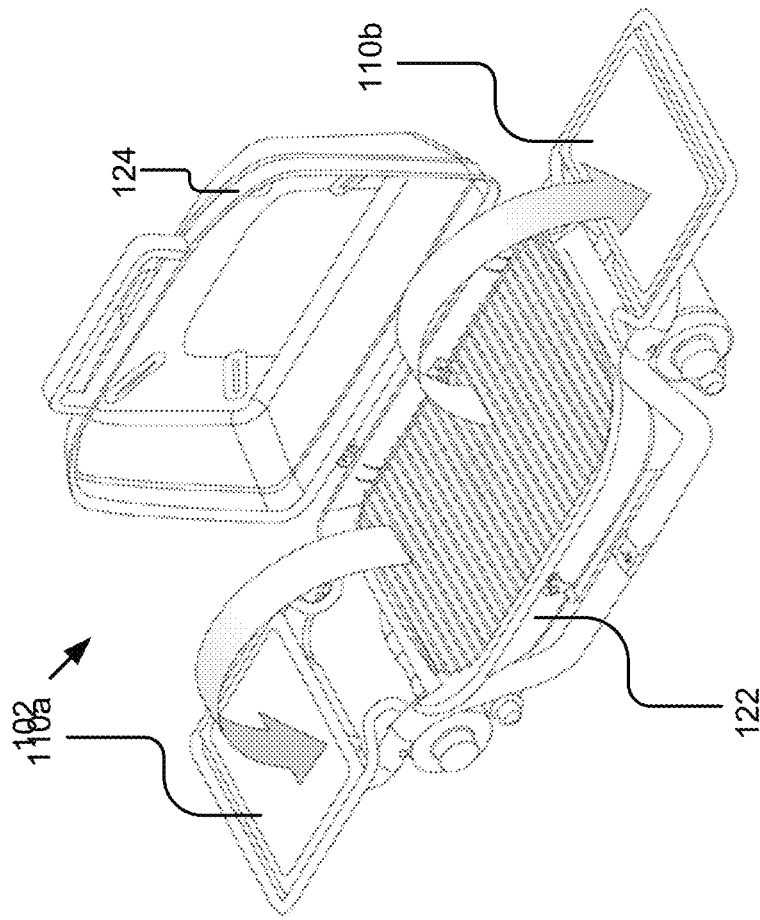
FIG. 2E illustrates an example grill system with example preparation tables folded outward in a deployed position.
Figure 2D:
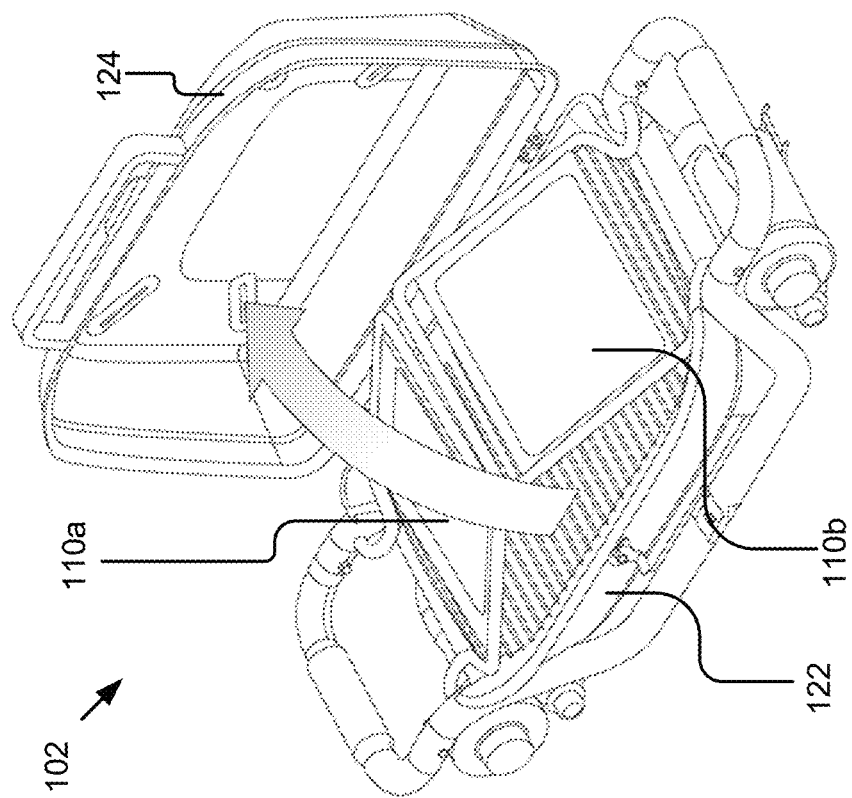
FIG. 2D illustrates an example implementation of a grill system with example preparation tables folded inward in a storage position.

FIG. 2D illustrates an example implementation of a grill system 102 with example preparation tables 110 folded inward toward the interior of the grill body 104 and FIG. 2E illustrates the example grill with the example preparation tables 110 folded outwards in a deployed position. For example, the grill system 102 may include one or more preparation tables 110 coupled to the chassis 106 and adapted to pivot between an open position and a closed position. The preparation tables 110 may rest on the handles 126 of the chassis 106 when in the open position. As illustrated in the example of FIG. 2D, the preparation table(s) 110 may contact the hood 124 when in the closed position, so that the hood 124 exerts a force on the preparation table(s) 110 when the hood 124 and the one or more preparation tables 110 are closed.

As illustrated in the example implementation, the preparation tables 110 may be coupled with the chassis 106 and/or grill body 104. The preparation tables 110 may be extended to the sides by folding the preparation tables 110, attaching them, or sliding them outwards. For instance, FIG. 2E illustrates the preparation tables 110 in a folded-out position and FIG. 2D illustrates the preparation tables 110 folded into a storage position inside the grill body 104.

In some implementations, the preparation tables 110 may be foldable/unfoldable or extendable/retractable to decrease the overall size of the grill system 102. For instance, as illustrated, the preparation tables 110 may pivot about an axis until they pass through a notch or other opening in the grill body 104 (e.g., in a grill base 122 and/or hood 124), so that the preparation tables 110 are inside of a cavity formed by the grill when stored. In some implementations, the preparation tables 110 may fold to an angle such that they do not contact a grill grate, so that they remain clean or do not contact the hot surface. A beveled edge or a bent portion 412 of the table (shown in FIG. 5C) may prevent a preparation table 110 from lying flat on the grill surface.

In some implementations, the storage angle of the preparation tables 110 may be configured so that a top edge of a preparation table 110 contacts an inner surface of the grill hood 124 when the preparation table 110 is folded and the grill hood 124 is closed. When the grill hood 124 is completely closed, it may slightly deflect or bend the inner surface or preparation table 110, thereby applying compression and reducing movement and rattling of the preparation tables 110, the grill hood 124, and potentially other components of the grill system 102 under physical stress (e.g., tension and/or compression), such as the frame/handles 126 and/or the grill base 122 (e.g., when a top edge of the grill base 122 contacts a top surface of a preparation table 110 when folded). In some implementations, a different component of the preparation table 110, such as the bottom surface, may contact the grill hood 124, for example, at a bottom edge of the grill hood 124 to apply physical stress (e.g., tension and/or compression) to the system.

Figure 5A:
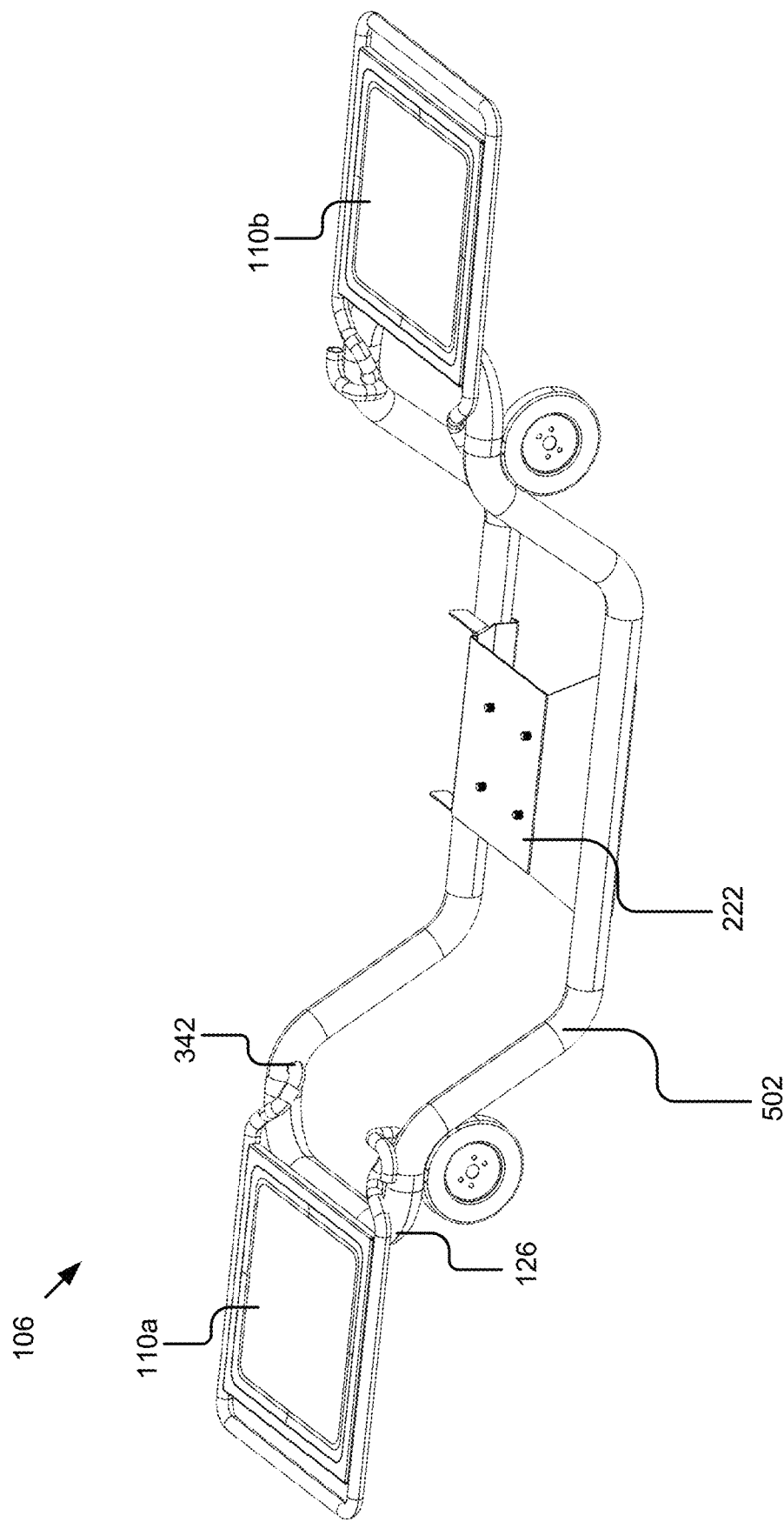
FIG. 5A illustrates an example chassis system.
Figure 5B:
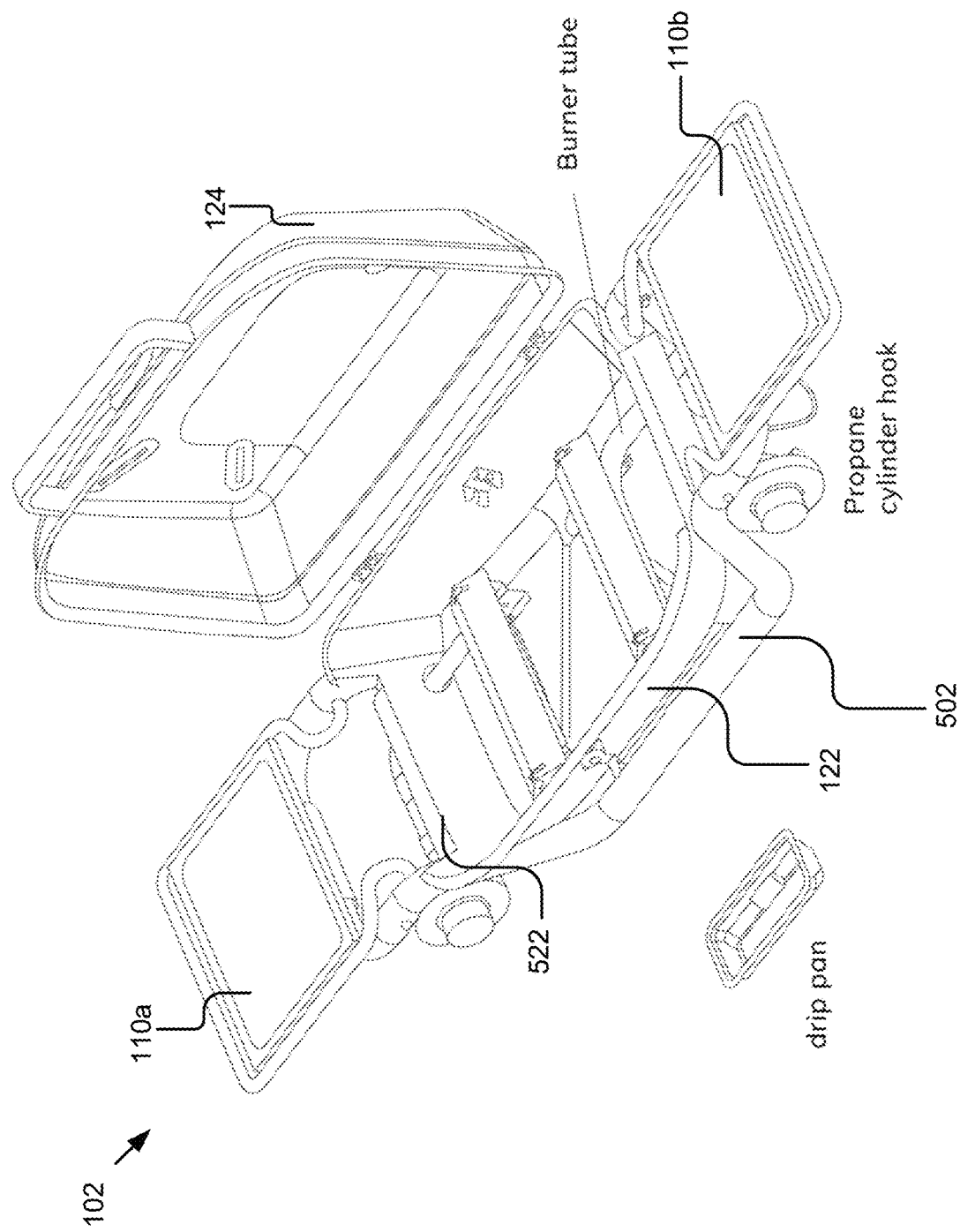
FIG. 5B illustrates an example grill body including a base and hood in an open position.
Figure 5C:
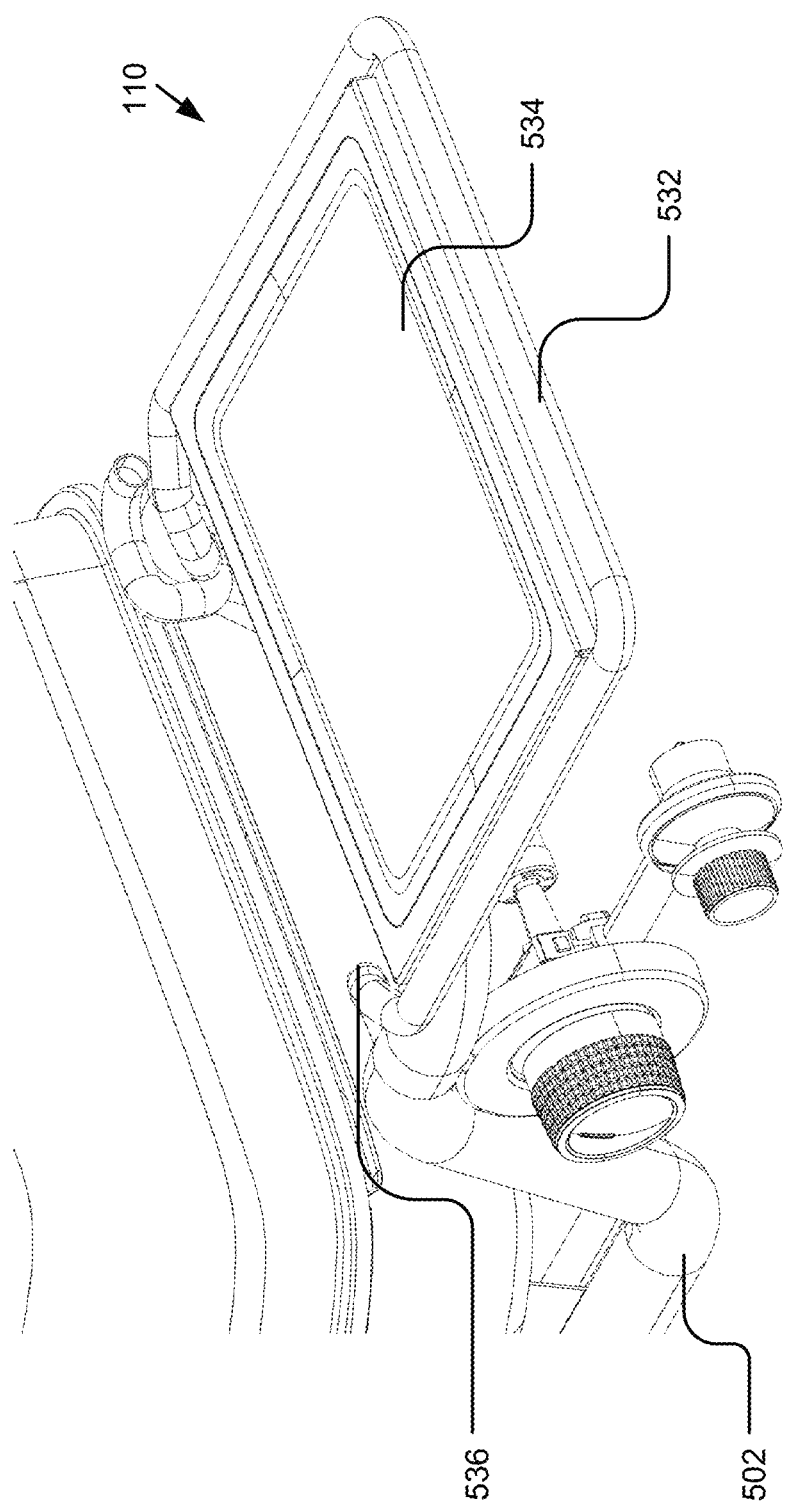
FIG. 5C illustrates an example side preparation table.

The preparation tables 110 may be rectangular, or have a tube and attached plate structure, as illustrated in FIG. 5C. In some implementations, the shape and configuration of the preparation tables 110 allows them to rest on the handles 126 or frame when extended and the frame, grill base 122, etc., when folded. In some implementations, the handles 126 may be coupled with the grill base 122 or the frame and may provide vertical support to the preparation tables 110, as described above.

Figure 5D:
FIG. 5D illustrates an example accessory burner.

Example implementations of the preparation tables 110 are further illustrated and described in reference to FIGS. 5C and 5D.

Figure 2F:
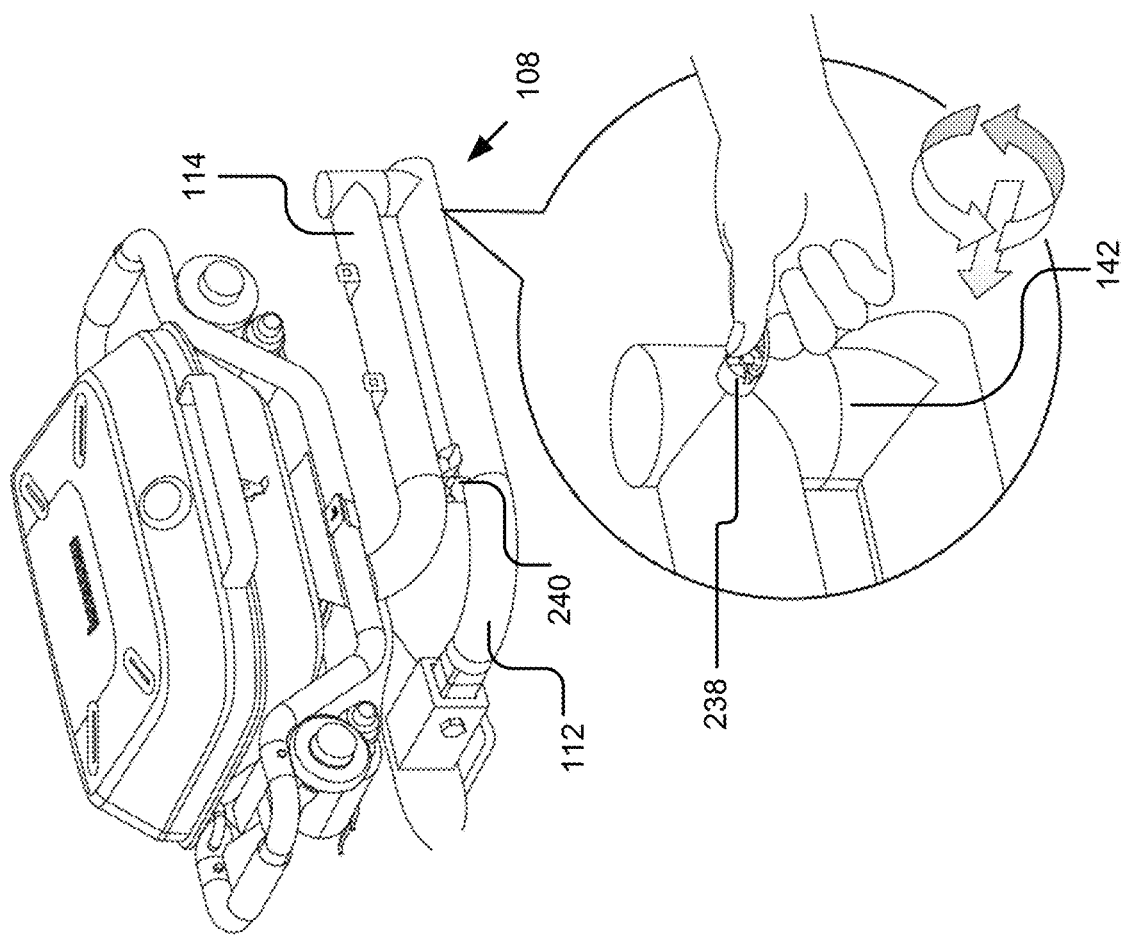
FIG. 2F illustrates an example grill system and swing-arm system with an example pivot lock.

FIG. 2F illustrates an example grill system 102 and swing-arm system 108 with one or more example pivot locks 238. For example, the swing-arm system 108 may include a swing arm 114 release and/or pivot lock 238 for locking the swing arm 114 in one or more orientations. For instance, the pivot or swivel lock 238 may include a pull pin, slider, friction collar or clutch, ratcheting mechanism, etc., for locking the swing arm 114 in one or more angles to the hitch arm 112. For instance, the pivot lock 238 may lock the swing arm 114 to be parallel to the hitch arm 112 and/or rear of the vehicle. The pivot lock 238 may have a continuous/infinitely variable range of locking angles and, in some implementations, may have one or more hard stops. For instance, the pivot lock 238 may stop the swing arm 114 parallel to the hitch arm 112, perpendicular to the hitch arm 112, etc.

For instance, the pivot lock 238 may include a pin, as illustrated in FIG. 2F, that may be pulled out, the swing arm 114 may be rotated, and the pin may be replaced to lock the swing arm 114 in position. The pin may be replaced with a screw knob, or a slidable or swingable tab, which stops rotation and/or increases friction. For instance, a thumb screw may be tightened to engage higher friction on a clutch or friction collar.

In some implementations, the swing-arm system 108 may also include a swing arm release 240 that couples the swing arm 114 with the hitch arm 112 to prevent unintended rotation of the pivot mechanism 142, for example, during movement of the vehicle. For instance, the swing arm release 240 may be a lever, pin, or other lock/catch mechanism that locks the swing arm 114 in place. The swing arm 114 release may be configured to be openable simply and without using a tool. For instance, the swing arm 114 release may include a button or latch, as illustrated in the example of FIG. 2F, although other implementations (e.g., pin, lock, padlock, etc.) are possible. In some implementations, the swing arm 114 release may also include a stop or back plate that prevents the swing am from ever rotating past the hitch arm 112, which might allow the swing arm 114 or grill system 102 to contact the vehicle.

Figure 2G:
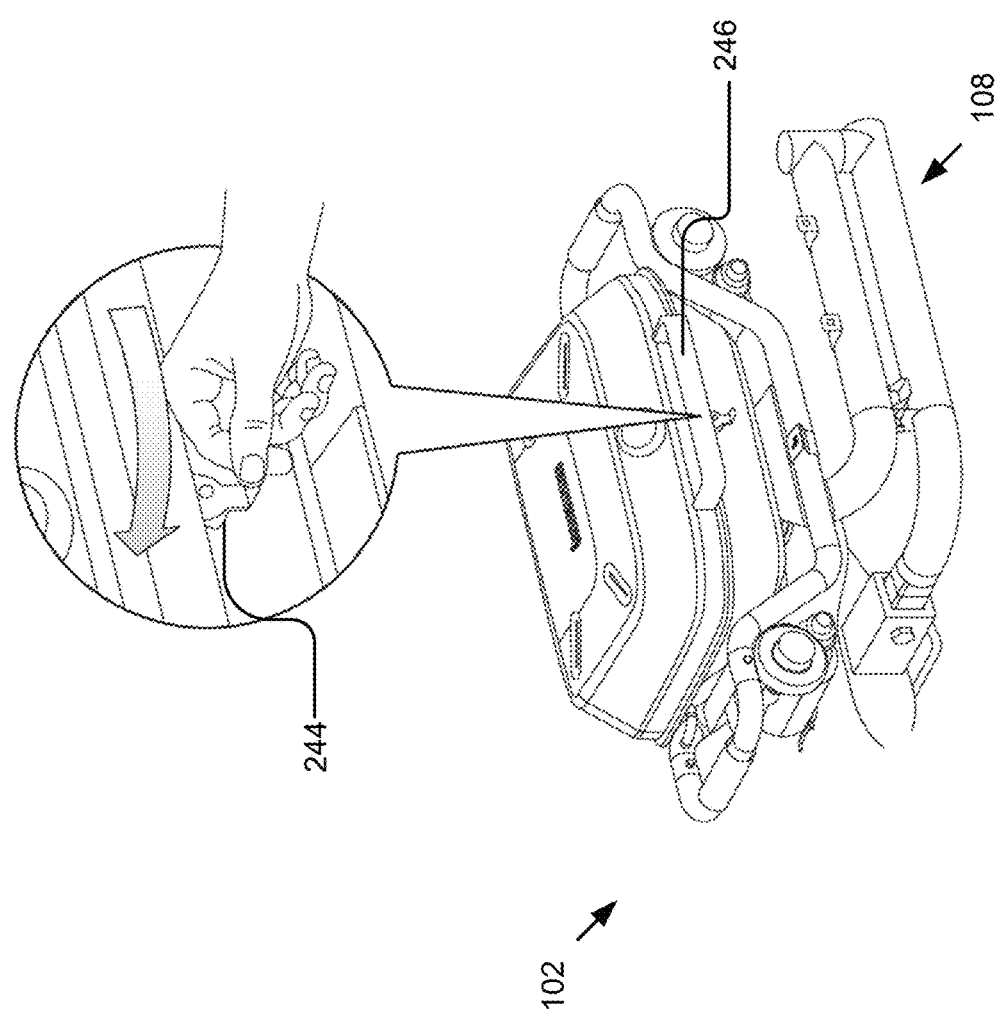
FIG. 2G illustrates an example grill system with an example hood locking mechanism.

FIG. 2G illustrates an example grill system 102 with an example hood locking mechanism 244. In some implementations, the grill system 102 may include one or more locking mechanisms 244 for holding the grill hood 124 open or closed. For instance, the locking mechanism 244 may secure the grill hood 124 closed using a lever or pivoting hook mounted to the base 122 or the hood 124 and engaging with a fixed post on the opposing base 122, hood 124, frame, preparation table 110, or storage tray, etc., for example.

In some implementations, a handle 246 connected to the hood 124 may include button or release lever that releases the locking mechanism 244.

In some implementations, the grill system 102 may include a storage tray (not shown) coupled with, for example, the grill base 122 and allowing various items to be stored inside. The storage tray may fold out or close against the grill base 122 to form a cavity that may be used to store seasonings, utensils, etc. The storage tray and/or grill base 122 may have insulation or an air gap separating the storage cavity from the hot surface of the grill to prevent plastic utensils or seasoning containers from accidentally melting.

In some implementations, the storage tray may be positioned over the top of one or more burner knobs of the grill system 102 to hide and provide protection to the burner knobs.

In some implementations, the locking mechanism 244 may lock the grill hood 124 with the storage tray, so that when the hood 124 is closed, the storage tray is closed, and the locking mechanism is locked, both the hood 124 and the storage tray are locked together in the closed position. Similarly, when either one of the hood 124 and the storage tray is open, the other locking mechanism (e.g., using the lever in the handle) does not need to be unlocked to open the other component. For instance, when the storage tray is open, the locking mechanism coupled with the hood 124 cannot contact the catch in the storage tray and the locking mechanism (e.g., using the lever in the handle) does not need to be unlocked to open the hood 124.

Figure 3A:
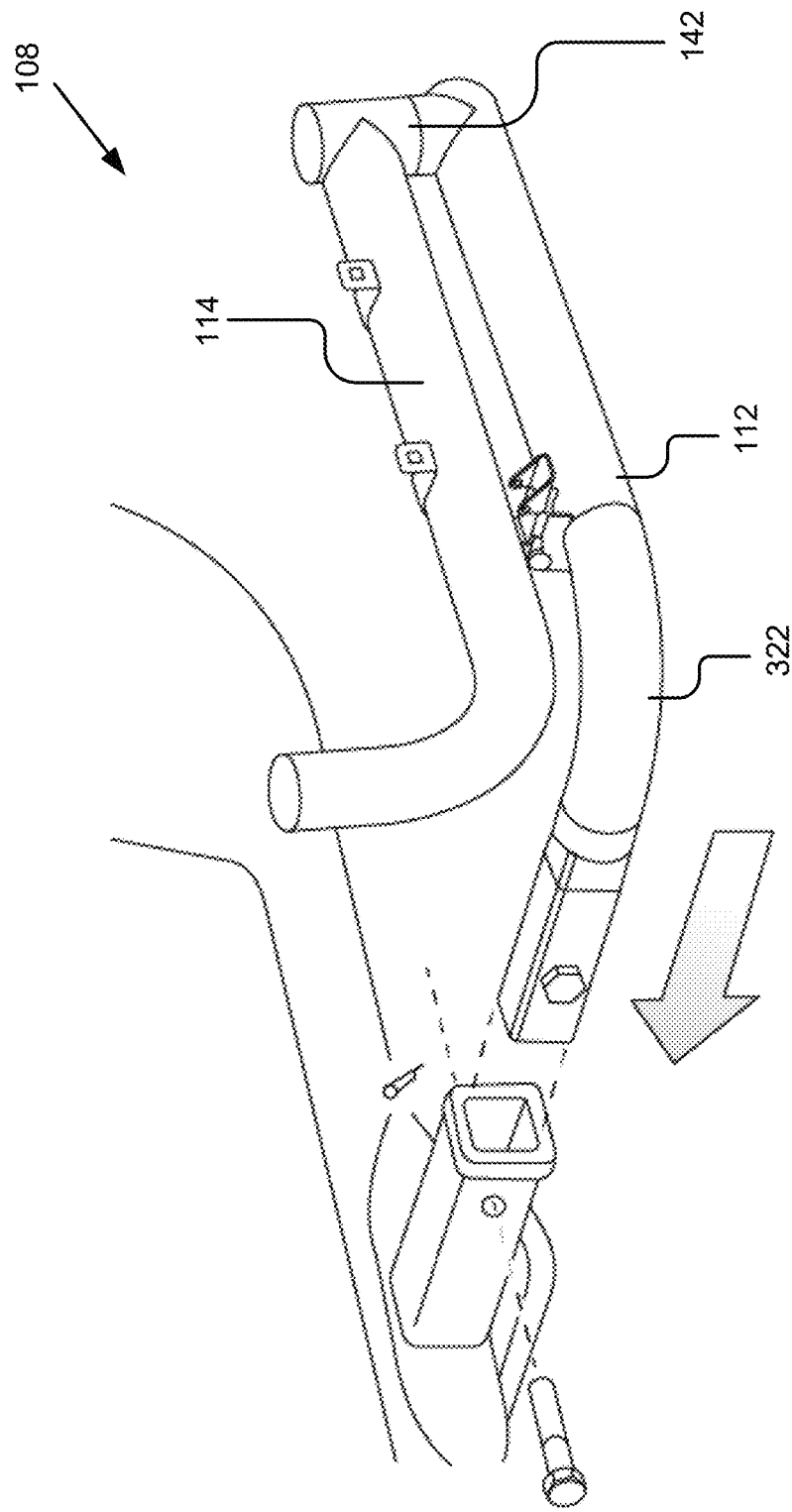
FIGS. 3A and 3B illustrate an example swing-arm system.
Figure 3B:
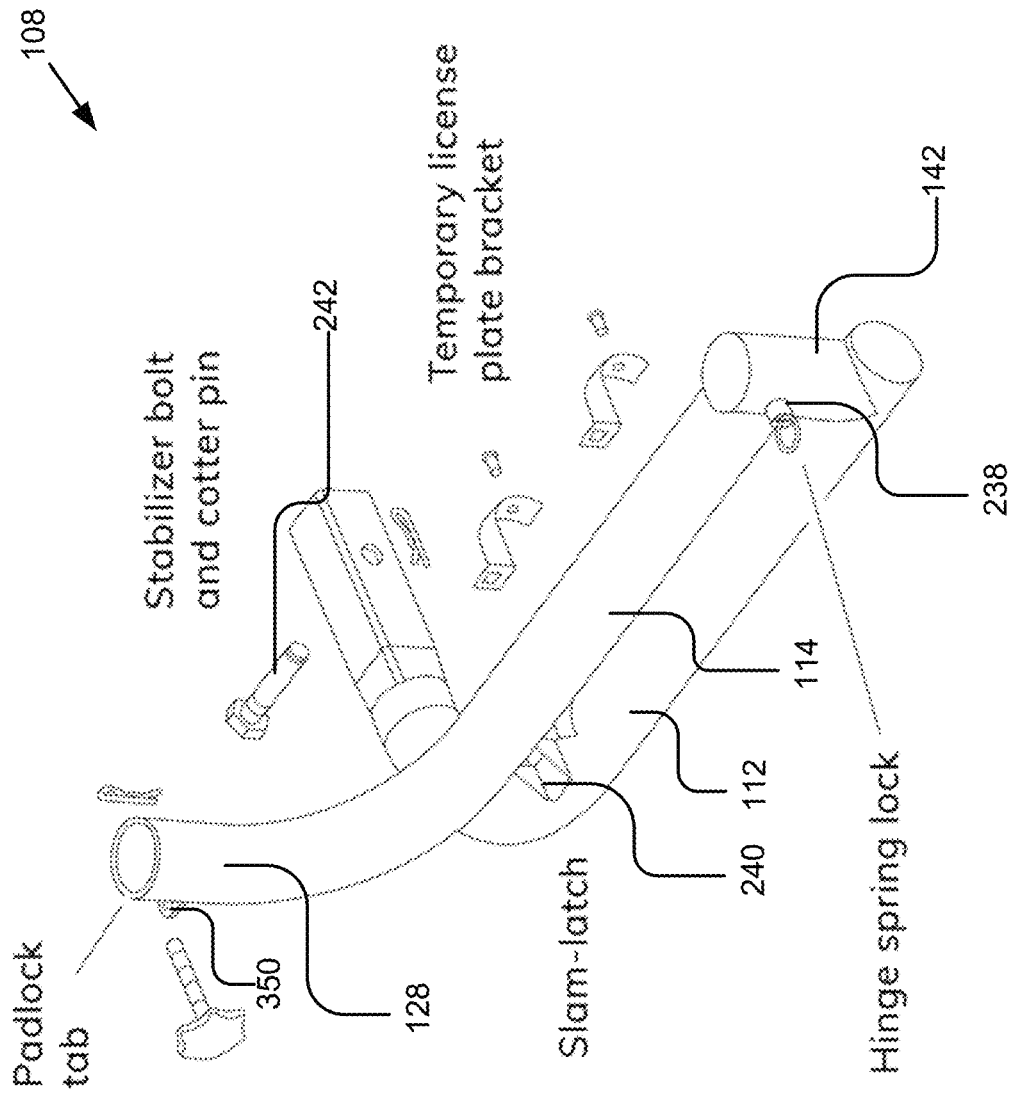

FIG. 3A illustrates an example swing-arm system 108 and vehicle hitch-receiver. FIG. 3B illustrates an example swing-arm system 108 decoupled from a grill body 104 and from a vehicle. As illustrated, the swing-arm system 108 may include a hitch arm 112, swing arm 114, pivot mechanism 142, pivot lock 238, swing arm 114 release 240, receiver lock 242, tower or vertical portion 128, and/or other components.

The hitch arm 112 may pivotably couple with the swing arm 114 via the pivot mechanism 142, which may be a hinge that allows the swing arm 114 to rotate between a closed position shown in FIG. 1B and an open position shown in FIG. 1A. The pivot mechanism 142 may be continuously variable through a range of movement, so that the grill system 102 may be stored next to a vehicle or may open for access to a trunk, hatch, or tailgate of the vehicle. In some instances, the pivot mechanism 142 may have a defined range that prevents the grill from hitting the vehicle.

In some implementations, the hitch arm 112 may couple with a hitch receiver using a receiver lock 242, which may include a mechanism for locking and/or tightening the connection between the hitch receiver and the hitch arm 112. For instance, the receiver lock 242 may include a stabilizer bolt and cotter pin.

In some implementations, the receiver lock 242 may include a mechanism for tightening the connection between the hitch receiver and the hitch arm 112. For instance, the receiver lock 242 may include a knob and screw mechanism that may be tightened to expand a total width or height of the portion of the swing arm 114 inserted into the hitch receiver thereby making the fit tighter and reducing movement of the hitch arm 112 and grill system 102. For instance, the receiver lock 242 may expand a wedge or insert a metal or plastic shim to reduce the space between the hitch receiver and the portion of the hitch arm 112 inserted into it.

In some implementations, the hitch arm 112 may have a pass through (not illustrated), additional hitch receiver, additional hitch arm 112, etc., for coupling a hitch ball for a trailer, a second grill system 102 using a second swing-arm system 108, or other accessories. For example, the hitch arm 112, or an adapter mechanism, may include multiple hitch receivers for adding accessories, for example, using a similar swing-arm system 108 as described herein. For instance, the additional hitch receivers or hitch arms 112 may mount an umbrella, cutting board, second grill system 102, or other accessories.

In some implementations, the swing-arm system 108 may allow the orientation of the swing-arm system 108 to be switched from right-handed to left-handed orientation, for example, so the hitch arm 112/swing arm 114 may extend either to the right or to the left from the hitch receiver.

In some implementations, the swing-arm system 108 may include a hinge at the elbow 322 for rotating the grill system 102 between orientations (e.g., by rotating the grill body 104/chassis 106 and pivot mechanism 142 to the other side of the vehicle). For example, the swing-arm system 108 may include an additional hinge(s) or rotation mechanism(s) for rotating one or more of the hitch arm 112 and swing arm 114 to allow the orientation of the swing-arm system 108 to be changed. For instance, the swing arm 114 may rotate 90 degrees (e.g., along its length), the hitch arm 112 may rotate 90 degrees (e.g., along its length), the tower may be inserted into the hitch receiver, and the hitch arm 112 may be coupled with the grill chassis 106 (i.e., instead of the tower attaching to the chassis 106).

In some instances, the swing-arm system 108 may include a license plate bracket for mounting a license plate.

Figure 4A:
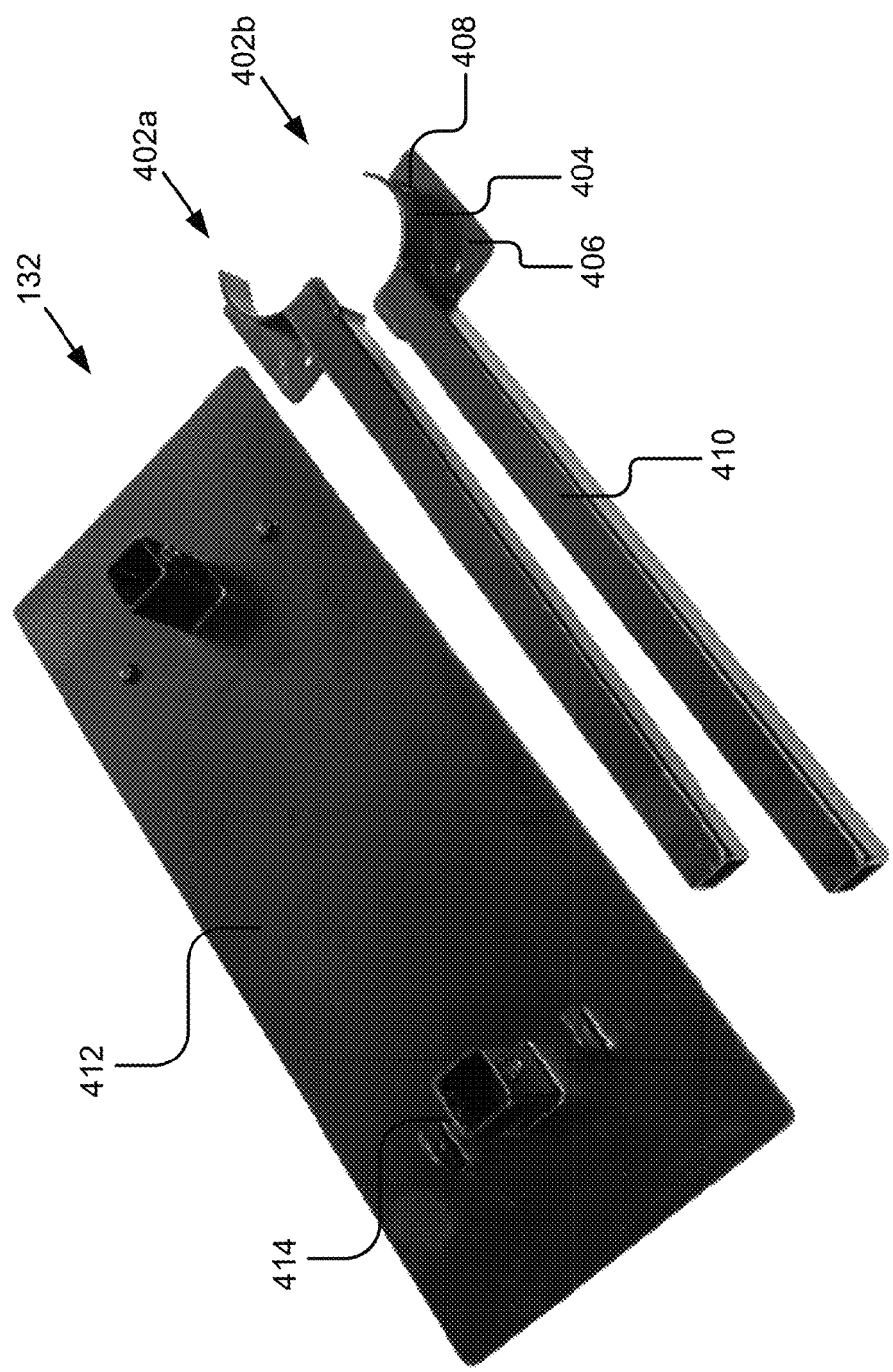
FIG. 4A illustrates a bottom view of an example accessory table and accessory mounting bracket.

In some implementations, the swing-arm system 108 may include accessory mounting points, which may include recesses, protrusions, or other structures for receiving accessories. For instance, a top surface of a hitch arm 112 or swing arm 114 may include holes into which an accessory mounting bracket, table legs, or other devices may be inserted thereby mounting additional accessories. Other accessory mounting points may include threaded bolt holes located along one or both horizontal sides of the hitch arm 112 or swing arm 114, so that an accessory mounting bracket, such as is illustrated in FIG. 4A may be coupled therewith leading to a configuration, such as is illustrated in FIG. 1D.

Figure 3C:
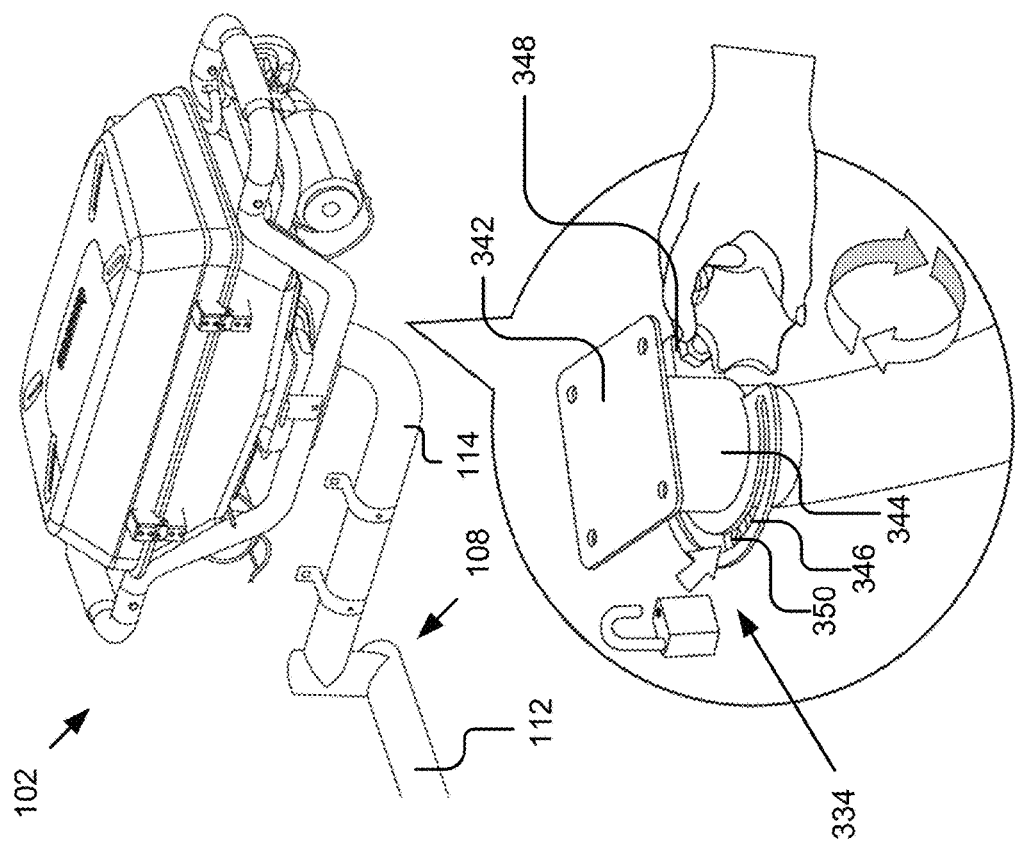
FIGS. 3C and 3D illustrate an example grill mounting member, such as an arm collar for coupling a swing arm with a grill body.
Figure 3D:
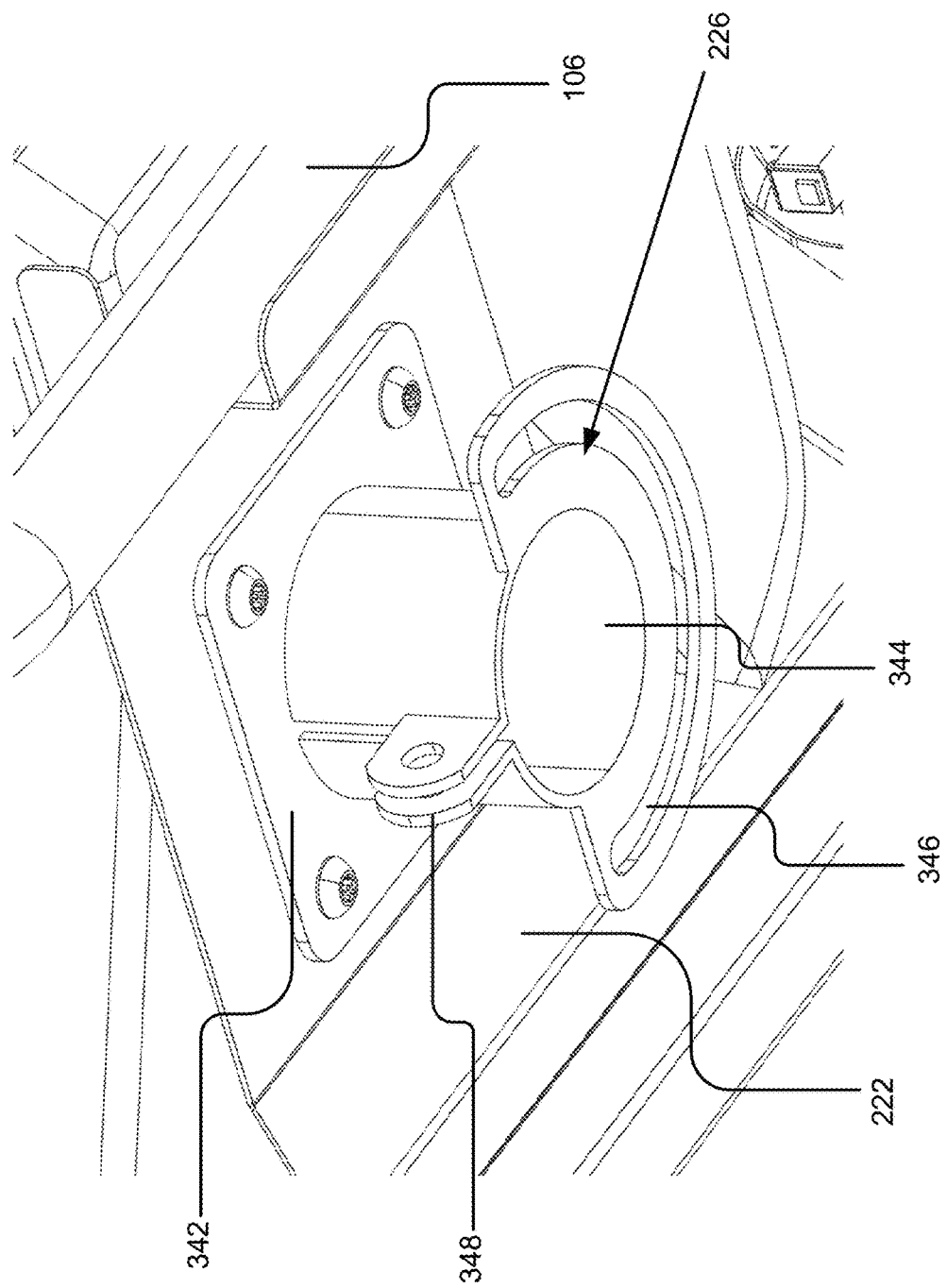

FIGS. 3C and 3D illustrate an example grill mounting member 334, such as an arm collar 226 for coupling the swing arm 114 with the with the chassis 106 and/or grill body 104. For example, a gill-mounting member 334 may be a tower, portion of a tower, and/or device coupled with or couplable with the swing arm 114 that allows the grill body 104 to be attached thereto. For instance, the grill-mounting member 334 may include an arm collar 226 couplable to one or more of the swing arm 114, a chassis 106, and a grill body 104.

In some implementations, the tower or swing arm may extend upward to support the chassis 106 of the grill system 102. In some implementations, the tower may couple with the chassis 106 using a friction collar or other rotatable mechanism for allowing the chassis 106/grill body 104 to pivot on the tower.

In some implementations, the arm collar 226 may include a mounting plate 342 including a flat top surface that is adapted to couple to one or more of the chassis 106 (e.g., via an adapter plate 222) and the grill body 104. For instance, the mounting plate 342 may include fasteners, fastener receivers, or other structures for attaching various devices, such as a grill body 104, chassis system 106, or another object to the arm collar 226.

In some implementations, the arm collar 226 may include a friction collar 344 coupled with the mounting plate and adapted to provide rotational friction between the friction collar 344 and the tower of the swing arm 114. The friction collar or other mechanism may open or stop rotation of the grill system 102 by tightening or loosening the friction collar 344, inserting a pin into a hole to serve as a stop, etc. For instance, the chassis 106 or tower may include a rotational release lever that stops the grill system 102 at a particular angle or releases its rotation, for example, by engaging a mechanical stop or increasing friction. In some implementations, the coupling between the chassis 106 and the tower may use both a friction and hard stop, so the grill system 102 may rotate infinitely within a defined range of angles (e.g., to prevent the grill system 102 from striking the vehicle).

The friction collar 344 may include a collar (e.g., with a gap around its circumference allowing it to be tightened) or sleeve into which a portion of the tower of the swing-arm system 108 may be inserted. The friction collar 344 may include a screw hole and bolt 348 that tightens the collar/sleeve to prevent rotation, decrease rattling, and potentially lock the grill system 102 to the swing-arm system 108. In some implementations, the tower may include a ring that slides into the collar 344, so that when the collar is sufficiently tight, the grill system 102 cannot be removed from the swing-arm system 108 because the ring is larger than the tightened collar.

In some implementations, the arm collar 226 may include a channel 346 extending circumferentially around the arm collar 226, the channel adapted to couple with the swing arm 114 while the arm collar 226 rotates around an axis formed by the tower of the swing arm 114. It should be noted that in an alternative implementation, the channel 346 may be located on the swing arm 114 instead of the arm collar 226. For instance, arm collar 226 may include an arc-shaped channel 346 through which a component of the tower (e.g., a protrusion), for example, may slide, thereby defining a range of rotation of the grill system 102 while the grill system 102 is attached to the swing-arm system 108. In some instances, the tower may include a tightenable screw, padlock, clamp, spring-loaded pin, or other device for locking the grill system 102 to a given orientation. In some implementations, the arc-shaped channel 346 may include or be replaced by bumps, gears, etc., to provide rotation stops.

In some implementations, the swing arm 114 (e.g., a tower thereof) may include a tab 350 coupled thereto, which may include aperture that aligns with a portion of the channel 346 when the arm collar 226 is coupled to the tower, the aperture allowing a locking member (e.g., a bolt, padlock, or other fastener) to pass through the aperture and the channel 346 to lock the arm collar 226 to the swing arm 114 (e.g., to a vertical portion 128 or tower).

In some implementations, the arm collar 226 may include a height adjustment mechanism where a pin, screw, or other mechanism may be inserted through a pass-through, hole, etc., of the tower to lock the tower at a given height and/or rotation respective to the protrusion. For example, the protrusion may include a friction collar (e.g., as described elsewhere herein) and the tower may pass through the friction collar, which may be used to set a height and/or rotation of the tower.

In some implementations, the swing arm 114 and chassis 106 may be configured to decouple from one another, for instance, by releasing a rotational release lever, loosening a screw on a friction collar, removing a quick-release pin inserted through the chassis 106 into a component of the swing arm 114, etc. Accordingly, the chassis 106 and grill body 104 may be lifted from the tower using handles 126 on the chassis 106. The tower may then couple with other accessories, such as umbrellas, cutting boards, storage boxes, handwashing stations, etc., using the same or similar mechanism as the grill system 102.

In some implementations, the grill-mounting member may include a rotational release lever in the adapter plate 222, frame, handle, etc., for engaging or releasing a mechanism that allows/disallows rotation of the grill system 102 and/or allows the grill system 102 to be decoupled and lifted from the swing-arm system 108. For instance, the rotational release lever may include a button or lever that pulls a pin (e.g., from a hole or channel) that locks the rotation or locks the base system to the tower.

In some implementations, the tower may be extendable to allow the grill system 102 to be lifted or lowered to accommodate different vehicle heights. For instance, the tower may include a slidable, lockable sleeve (e.g., using friction or pin, etc., as described elsewhere herein) or additional bar that allows the tower to be shortened or extended.

In some implementations, the swing-arm system 108, tower, or chassis 106 may tilt forward/rearward or left/right to allow the grilling surface and/or preparation tables 110 to be leveled in one or more directions. For instance, if a vehicle is parked with a front end of the vehicle at a different height than the rear of the vehicle, food may slide or roll off the grilling service. In some instances, the tower may include pivot points or other mechanisms for leveling the grill surface.

In some implementations, the tower or other portion of the swing arm 114 (e.g., at a grill-mounting member 334, hinge, adapter plate 222, or other component) may include a gimbal mechanism that levels the grill and/or any associated accessories coupled with the gimbal mechanism. The gimbal/leveling device may include various mechanisms for adjusting the levelness of the grill, accessory, tower, swing arm 114, or other component. For instance, the gimbal may couple the grill and/or grill chassis 106 to the tower and level the grill. Depending on the implementation, the gimbal may include a ball and socket with a tightening screw and/or locking pin in the socket (e.g., in place of, in addition to, or similar to the friction collar described elsewhere herein), or it may include another pivoting suspension device.

FIG. 4A illustrates a bottom view of an example accessory table 132 and accessory mounting bracket(s) 402a and 402b. The example accessory table 132 and accessory mounting brackets 402a and 402b are also illustrated in the example of FIG. 1D.

In some implementations, the swing-arm system 108, such as on the hitch arm 112, swing arm 114, tower, etc., may include mounting points for adding additional accessories. In some implementations, the mounting points may include a vertical hole at the pivot mechanism 142 or notches along the length of the swing arm 114 or hitch arm 112, so that a collar or fork-like structure could be tightened around the hitch or swing arm 114 body, for instance, without allowing the bracket 402 to rotate about the arm. For example, these example implementations allow posts or legs that support a table, cutting board, cooler, or umbrella to be easily and securely mounted to the swing-arm system 108. The accessory mounting points may include structures, such as square impressions, grooves, channels, protrusions, threaded bolt holes, bolts, or other devices on a hitch arm 112 and/or swing arm 114. In some instances, the accessory mounting bracket 402 may include a collar that extends fully or partially around a hitch arm 112 or swing arm 114 or otherwise couples with the accessory mounting point(s), thereby reducing the likelihood that an accessory would rotate about one of the arms or otherwise become loose.

As illustrated in the example implementation of FIG. 4A, an accessory mounting bracket 402 may include contour(s) 404 matching a hitch or swing arm 114, reinforcing member 406, mounting point(s) 408, and/or extended poles 410, which may serve as legs (e.g., 134) to an accessory, such as a table or cutting board.

FIG. 4A also illustrates a reinforced bottom surface 412 of an accessory table 132, which may be a cutting board. For instance, the bottom surface 412 may be a metal plate or other suitably strong structure, which couples the accessory mounting bracket 402 (e.g., legs/poles thereof) to the accessory table 132. For example, the bottom surface 412 may include one or more receiving sleeves or accessory-bracket mounting points 414 into which the pole/leg 410 may be inserted, or an accessory mounting bracket 402 may otherwise be attached.

In some implementations, the bottom surface 412 may include other structures, such as hangers, mounting points, a bottle opener, or other devices.

Figure 4B:
FIG. 4B illustrates a top-perspective view of an example accessory table.

FIG. 4B illustrates a top-perspective view of an example accessory table 132, which may be a cutting board. As illustrated, the accessory table 132 may include a flat top surface, which may provide a preparation surface, cutting board, or other workspace. FIG. 4B also illustrates two example accessory mounting brackets, which may be mounted to the accessory table 132 and serve as legs, such as illustrated in the example of FIG. 1D.

In some implementations, the accessory mounting brackets 402 may be U shaped, flat, or have various other shapes. In some implementations, the accessory mounting brackets 402 may include magnetic or spring-loaded pins, which may interact with (e.g., insert into) the accessory mounting points (e.g., on a hitch arm 112, swing arm 114, or other device) thereby allowing the accessory mounting bracket(s) 402 to be quickly and easily secured. Clamps, straps, hinged bars, ratcheting straps, or other mechanisms may additionally or alternatively be used to couple the bracket or accessory to the swing-arm system 108. Other devices extending between the ends of the coupling portion and under the hitch arm 112 or swing arm 114 may be used to apply force to the bottom, top, or sides of the hitch arm 112 or swing arm 114. In some instances, the ends of the coupling portion may be tightened, such as using a tightenable screw/handle, to tighten (e.g., pull together) the ends to clamp or pinch down on the sides and/or bottom of the hitch or swing arm 114.

It should be noted that although bolts, screws, pins, clamps, and other structures are described, other fasteners or fastening mechanism are possible and contemplated herein.

For instance, accessory mounting bracket 402 may include legs or elongated poles 410 for coupling accessories. For example, accessory mounting bracket 402 may be integrated with or have various structures for coupling accessories, such as an umbrella, ice bucket, cooler, mounting plate (e.g., of a grill system 102 or other accessory), chair, table, etc., so that it may modularly add various accessories. In some implementations multiple accessory couplers may be used together to mount an accessory, which may be mounted to a hitch arm 112 to provide a working or seating (e.g., a seat may be similarly configured) surface when the swing arm 114 and grill system 102 are pivoted away from the hitch arm 112.

FIG. 5A illustrates an example chassis system 106, which may provide rigidity, support, mounting points, and/or handles 126 to the grill body 104. In some implementations, the chassis system 106 may adaptably mount devices, such as a grill body 104, storage container, or other devices to a vehicle using a swing arm 114. The chassis system 106 may include, for example, a frame 502, an adapter plate 222, and a connection point or arm collar 226 (coupled or couplable to the frame or adapter plate 222, as noted above), as well as other components. The chassis system 106 may mount to a swing-arm system 108, such as via a tower, vertical portion, arm collar 226, or other grill-mounting member, as described above. For instance, a tower may couple with the arm collar 226, the arm collar 226 may be attached to the adapter plate 222, and the adapter plate 222 may be attached to one or more of the frame 502 and the grill base 122. The chassis system 106 may also be used to mount other items, for example, the chassis system 106 may be expanded or re-configured to other sizes or shapes of grills and accessories.

The chassis system 106 may be beneficial over connecting the swing-arm system 108 directly to the grill body 104 or a simple leg system, because removably mounting the grill system 102 to a vehicle requires significant strength that a simple leg system or direct connection may not provide. The chassis system 106 may include handles 126 for adjusting the grill system 102 or removing it, support for accessories, support for gas (e.g., propane) canisters, support for preparation tables 110, and significant additional rigidity to the grill system 102.

The frame 502 may include one or more circular or rectangular, large-diameter metal tubes that extend under and connect to the grill (e.g., the grill base 122, the adapter plate 222, etc.), preparation tables 110, etc., as illustrated in the examples. The frame 502 may, in some implementations, be separate from the grill body 104. The frame 502 may also serve as a support and for the grill body 104 when the grill system 102 is removed from the swing-arm system 108. In some implementations, the frame 502 provides significant strength beyond what separate members or legs would provide to the grill thereby improving the security of mounting it to the rear of the vehicle, lifting it from the swing-arm system 108, or placing heavy objects on the preparation tables 110.

In some implementations, portions of the frame extend along the sides of the grill body 104 but de-coupled from the grill body 104 to serve as handles 126. For instance, the frame 502 may include handle grips that add ruggedness and utility to the handles 126. The handles 126 may support the preparation tables 110 when extended and may support the weight of the grill system 102 when lifted.

The chassis system 106 may include an adapter plate 222 that couples the frame 502 (e.g., a front and a rearward side of the frame) with the grill base 122. The adapter plate 222 may couple the frame 502 to a swing arm (e.g., at a grill-mounting member). In some instances, the adapter plate 222 may be a stamped piece of metal that is bent to lower the frame below the connection point 306 to allow the frame to rest on a flat surface without interfering with the mounting point, for example, as illustrated in FIG. 2C.

FIG. 5B illustrates an example grill body 104 including a base 122 and hood 124 in an open position. The grill grate is also illustrated removed to provide better visibility into the grill base 122. As illustrated in the example, the side preparation tables 110 may be pivotably coupled with the frame 502, for example, a reinforcing tube of a preparation table may insert into the frame 502. Additionally, the example implementation of FIG. 5B illustrates notches 522 in the side of the grill body 104 through which the preparation tables 110 may pass when rotated into a cavity formed by the grill body 104 (e.g., as illustrated in the example of FIG. 2E).

FIG. 5C illustrates an example side preparation table 110, according to some implementations. For example, the frame may couple with the preparation tables 110 and, when the preparation tables 110 are extended, may support the preparation tables 110 as illustrated in FIG. 5C. The strength of the example frame 502 may allow other accessories to be attached to the grill system 102. For instance, a preparation table 110 illustrated in FIG. 5C may include a structural tube 532 or bar that supports the surface 534 of a preparation table 110 and couples to the frame 502. For instance, the preparation table tube 532 may rotatably extend into holes 536 in the frame 502 and around the frame 502 to rest on top of the frame 502/handles 126 when in an extended/open position.

In some implementations, the structural tube 532 or bar may attach to a center plate 534, which forms the surface of the preparation table 110. In some implementations, the center plate 534 may have different configurations, such as the accessory burner 544 illustrated in FIG. 5D, which may replace a flat center plate 534 thereby providing a side burner for the grill system 102.

FIG. 5D illustrates an example accessory burner 544 that may be mounted to a side preparation table 110 (e.g., by fastening to the tube 532), for example, by replacing a center plate 534 of the preparation table 110, although other implementations are possible and contemplated. For example, the accessory burner 544 may remain attached with the structural tube or frame of the preparation table 110 and pivot or retract into the grill body 104 when closed. For instance, a top surface of the preparation table 110 may include a propane burner, although other implementations are possible. In some implementations, in order to avoid interference between the preparation table 110 and the hood 124 of the grill when the preparation table 110 is stored/folded, a gas line or gas tank may be attachable/detachable from the preparation table 110 or burner 544 (e.g., using a quick release connector). As illustrated, the gas tank screws into a bottom of the burner/preparation table 110 assembly. Similarly, a gas line (e.g., with a permanent, threaded, or quick connect coupling) may extend to a heating element of the grill body 104 and/or a splitter on the propane tank of the grill to provide propane or other fuel and include a quick-release connector for coupling with the accessory burner 544. An example implementation of the accessory burner 544 coupled with a side preparation table 110 is illustrated in reference to FIG. 1D. It should be noted that other implementations are possible and contemplated, such as where the accessory burner 544 attaches to the top of a preparation table 110 or attaches to an accessory table 132, such as the table illustrated in FIG. 4A.

Figure 5E:
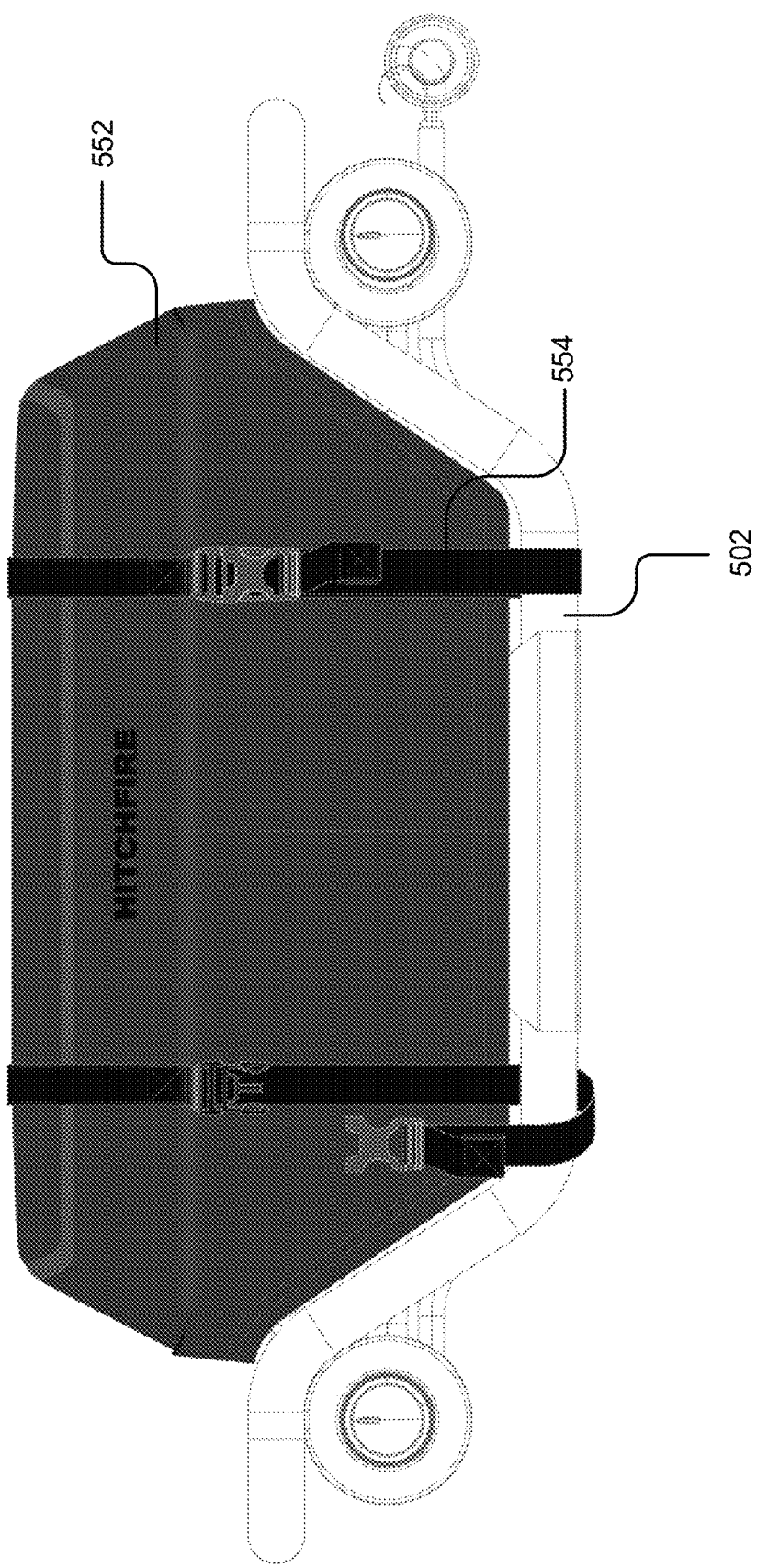
FIG. 5E illustrates an example grill cover.

FIG. 5E illustrates an example grill cover 552 tailored to the grill system 102, which is illustrated as attached to and covering the grill body 104, for example, to protect the grill body 104 from weather. In some implementations, the cover 552 may be configured to hold the grill system 102 in a closed position during transport, for example, to prevent the grill hood 124 from opening, the preparation tables 110 from opening, etc.

In some implementations, the cover 552 may include straps 554 that couple the cover to the grill body 104, chassis 106, and/or swing-arm system 108. For instance, the straps 554 may wrap around an entirety or a portion of the grill system 102 and couple to itself or the grill system 102 to hold the cover 552 secure when buffeted by wind when the vehicle is in motion. In some implementations, the straps 554 may couple to each other, the cover 552, and/or the grill system 102 using Velcro, plastic clips, magnets, Fidlock magnetic mount or buckle, or another method. In some implementations, in addition to or in place of the straps 554, an edge of the cover 552 may include magnets, clasps, clamps, buttons, or other fasteners that couple the cover to the metal of the chassis 106 and/or grill body 104. As illustrated in the example implementation, the straps 554 may extend around the frame 502 of the chassis system 106 to use the strength of the chassis system 106 to secure the cover 552 in place, for example, when it is buffeted behind a moving vehicle. Similarly, this configuration of the straps 554 may provide extra security to the hood 124 or lid of the grill system 102 thereby reducing rattling and the probability that the hood 124 will open during movement of the vehicle.

In the foregoing description, for purposes of explanation, numerous specific details are set forth in order to provide a thorough understanding of the technology. It will be apparent, however, that the technology described herein can be practiced without these specific details.

Reference in the specification to "one implementation", "an implementation", "some implementations", or "other implementations" means that a particular feature, structure, or characteristic described in connection with the implementation is included in at least one implementation of the disclosure. The appearances of the term "implementation" or "implementations" in various places in the specification are not necessarily all referring to the same implementation.

In addition, it should be understood and appreciated that variations, combinations, and equivalents of the specific implementations, implementations, and examples may exist, are contemplated, and are encompassed hereby. The invention should therefore not be limited by the above-described implementations, implementations, and examples, but by all implementations, implementations, and examples, and other equivalents within the scope and spirit of the invention as claimed.

What is claimed is:

1. A hitch-mountable grill system comprising:
a grill body including a hood and a base;
a swing arm system including a hitch arm adapted to couple to a hitch receiver of a vehicle, a swing arm coupled to the hitch arm by a pivot mechanism, a pivot lock adapted to stop rotation of the pivot mechanism, and a tower detachably coupling the swing arm to the grill body using an arm collar, the tower including a vertical portion of the swing arm, the arm collar being couplable to one or more of the swing arm, a chassis coupled to the grill body, and the grill body, wherein:
the arm collar includes:
a mounting plate including a flat top surface that is adapted to couple to one or more of the chassis and the grill body;
a friction collar including a flexible band surrounding the tower of the swing arm, a friction of the flexible band against the tower being adjustable by tightening or loosening the flexible band around the tower, the friction collar coupled with the mounting plate and adapted to provide rotational friction between the friction collar and the tower of the swing arm; and
a channel extending circumferentially around the arm collar, the channel adapted to couple with the swing arm while the arm collar rotates around an axis formed by the tower of the swing arm; and
the tower of the swing arm includes a tab coupled to the tower, the tab including an aperture that aligns with a portion of the channel when the arm collar is coupled to the tower, the aperture allowing a locking member to pass through the aperture and the channel to lock the arm collar to the tower, the tab being oriented at a right angle to the flexible band when the tower is inserted into the arm collar; and
one or more accessory mounting points connected with the swing arm system, the one or more accessory mounting points mounting an accessory separate to the grill body.

2. The hitch-mountable grill system of claim 1, further comprising:
an accessory mounting bracket coupled with the one or more accessory mounting points, the accessory mounting bracket coupled with an elongated pole, the elongated pole extending vertically from the swing arm system when the swing arm system is mounted to the vehicle.

3. The hitch-mountable grill system of claim 2, further comprising:
a cutting board including a flat top surface and a reinforced bottom surface opposing the flat top surface, the reinforced bottom surface including one or more accessory bracket mounting points that couple with the accessory mounting bracket to secure the cutting board with the swing arm system.

4. The hitch-mountable grill system of claim 2, wherein:
the one or more accessory mounting points include a structure connected with the hitch arm, the structure receiving and securely retaining a fastener of the accessory mounting bracket.

5. The hitch-mountable grill system of claim 1, further comprising:
the chassis including a frame attached to and supporting the grill body, the chassis including one or more handles integrated with the frame and located at one or more sides of the grill body.

6. The hitch-mountable grill system of claim 5, further comprising:
one or more preparation tables coupled to the chassis and adapted to pivot between an open position and a closed position, the one or more preparation tables resting on the one or more handles when in the open position, the one or more preparation tables contacting the hood when in the closed position, the hood exerting a force on the one or more preparation tables when the hood and the one or more preparation tables are closed.

7. The hitch-mountable grill system of claim 6, wherein:
the one or more preparation tables include a burner that pivots with the one or more preparation tables.

8. A system comprising:
a hitch arm adapted to couple to a hitch receiver of a vehicle at a first end of the hitch arm;
a pivot mechanism coupled to the hitch arm at a second end of the hitch arm;
a swing arm coupled to the hitch arm at a first end of the swing arm via the pivot mechanism, the pivot mechanism allowing the swing arm to rotate relative to the hitch arm, the swing arm adapted to couple with a grill-mounting member at a second end of the swing arm, the grill-mounting member being couplable to one or more of the swing arm, a chassis coupled to a grill body, and the grill body, wherein:
the grill-mounting member includes an arm collar couplable to one or more of the swing arm, the chassis coupled to the grill body, and the grill body, and the arm collar includes:
a mounting plate including a top surface that is adapted to couple to one or more of the chassis and the grill body;
a friction collar including a flexible band surrounding a tower of the swing arm, a friction of the flexible band against the tower being adjustable by tightening or loosening the flexible band around the tower, the friction collar coupled with the mounting plate and adapted to couple the friction collar with the swing arm; and
a channel extending circumferentially around the arm collar, the channel adapted to allow the arm collar to rotate; and
the swing arm includes a tab coupled to the swing arm, the tab including an aperture that aligns with a portion of the channel when the arm collar is coupled to the swing arm, the aperture allowing a locking member to pass through the aperture and the channel to secure the arm collar to the swing arm, the tab being oriented at a right angle to the flexible band;
a pivot lock coupled to one or more of the hitch arm, the swing arm, and the pivot mechanism, the pivot lock adapted to stop rotation of the pivot mechanism when the pivot lock is locked; and
one or more accessory mounting points connected with one or more of the hitch arm and the swing arm, the one or more accessory mounting points mounting an accessory, the one or more accessory mounting points being separate to the grill-mounting member.

9. The system of claim 8, further comprising:
the grill body including a hood and a base, the grill body including a heating element and a grill surface, the grill-mounting member detachably coupling the grill body to the swing arm.

10. The system of claim 8, further comprising:
an accessory mounting bracket coupled with the one or more accessory mounting points, the accessory mounting bracket coupled with an elongated pole, the elongated pole extending vertically from the one or more accessory mounting points when the hitch arm is coupled to the vehicle.

11. The system of claim 10, further comprising:
a cutting board including a top surface of the cutting board and a bottom surface opposing the top surface of the cutting board, the bottom surface including one or more accessory bracket mounting points that couple with the accessory mounting bracket to secure the cutting board to one or more of the hitch arm and the swing arm.

12. The system of claim 10, wherein:
the one or more accessory mounting points include a structure connected with the hitch arm, the structure receiving and securely retaining the accessory mounting bracket.

13. The system of claim 8, further comprising:
the chassis including a frame attached to and supporting the grill body, the grill body being mounted to the swing arm via the grill-mounting member, the chassis including one or more handles located at one or more sides of the grill body.

14. The system of claim 13, further comprising:
one or more side tables coupled to a grill and adapted to pivot between an open position and a closed position, the grill being coupled with the swing arm via the grill-mounting member, the one or more side tables resting on the one or more handles of the grill when in the open position, the one or more side tables contacting a hood of the grill when in the closed position, the hood contacting the one or more side tables when closed.

15. The system of claim 14, wherein:
the one or more side tables include a burner that pivots with the one or more side tables.

16. A system comprising:
a grill body including a heating element and a grill grate;
a hitch arm adapted to couple to a hitch receiver of a vehicle;
a swing arm coupled to the hitch arm;
means for coupling the swing arm with the grill body including an arm collar, the arm collar including a flexible band surrounding a tower of the swing arm, a friction of the flexible band against the tower being adjustable by tightening or loosening the flexible band around the tower, wherein:
the arm collar includes:
a mounting plate including a flat top surface that is adapted to couple to one or more of a chassis and the grill body, the arm collar being coupled with the mounting plate and adapted to provide rotational friction between the flexible band and the tower of the swing arm; and
a channel extending circumferentially around the arm collar, the channel adapted to couple with the swing arm while the arm collar rotates around an axis formed by the tower of the swing arm; and
the tower of the swing arm includes a tab coupled to the tower, the tab including an aperture that aligns with a portion of the channel when the arm collar is coupled to the tower, the aperture allowing a locking member to pass through the aperture and the channel to lock the arm collar to the tower, the tab being oriented at a right angle to the flexible band when the tower is inserted into the arm collar;
means for coupling the swing arm with the hitch arm and allowing the swing arm to pivot relative to the hitch arm;
means for stopping the swing arm from pivoting relative to the hitch arm;
an accessory table; and
means for mounting the accessory table to the hitch arm, the means for mounting the accessory table to the hitch arm being separate from the means for coupling the swing arm with the grill body.

\* \* \* \* \*